(12) United States Patent
Hong

(10) Patent No.: US 6,937,244 B2
(45) Date of Patent: Aug. 30, 2005

(54) APPARATUS AND METHOD FOR REDUCING THE MEMORY TRAFFIC OF A GRAPHICS RENDERING SYSTEM

(76) Inventor: Zhou (Mike) Hong, 11512 Country Spring Ct., Cupertino, CA (US) 95014

( * ) Notice: Subject to any disclaimer, the term of this patent is extended or adjusted under 35 U.S.C. 154(b) by 127 days.

(21) Appl. No.: 10/669,236

(22) Filed: Sep. 23, 2003

(65) Prior Publication Data

US 2005/0062750 A1 Mar. 24, 2005

(51) Int. Cl.$^7$ .............................................. G06F 12/02
(52) U.S. Cl. ....................... 345/544; 345/421; 345/545; 345/563; 345/556
(58) Field of Search .............................. 345/501, 530, 345/545, 544, 421, 422, 556, 418, 561–563

(56) References Cited

U.S. PATENT DOCUMENTS 6,348,919 B1 * 2/2002 Murphy ...................... 345/421
6,473,082 B1 * 10/2002 Hong et al. .................. 345/422
6,774,895 B1 * 8/2004 Papakipos et al. .......... 345/422

* cited by examiner

*Primary Examiner*—Kee M. Tung
(74) *Attorney, Agent, or Firm*—Anthony B. Diepenbrock, III; Dechert LLP

(57) ABSTRACT

A system and method for rendering a graphics primitive. A two pass method is employed where, in the first pass, for each block affected by the primitive, whether the pixels of the affected block intersect the front and/or back layers of the block is determined. If there are intersected pixels in the block, a flag is set indicating that the z-buffer must be read to determine the visibility of the affected pixels in the block. On a second pass, the blocks affected by the graphics primitive are again examined. If the flag is not set, then the visible pixels are rendered to the frame buffer based on the front and back layers of the block. If the flag is set, then for each sub-block affected by the primitive, the z-buffer is read and the visible pixels are rendered to the frame buffer based on the reading of the z-buffer.

9 Claims, 29 Drawing Sheets

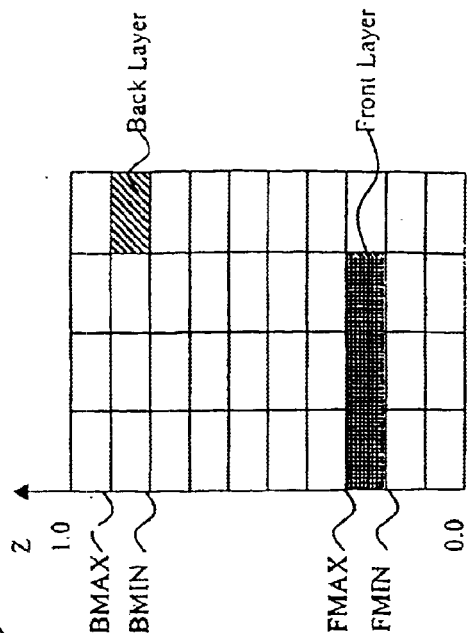
Fig. 8C
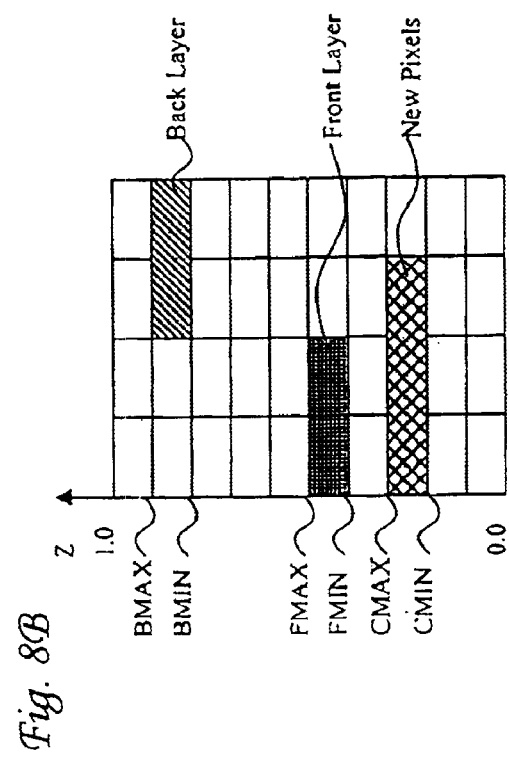
Fig. 8D
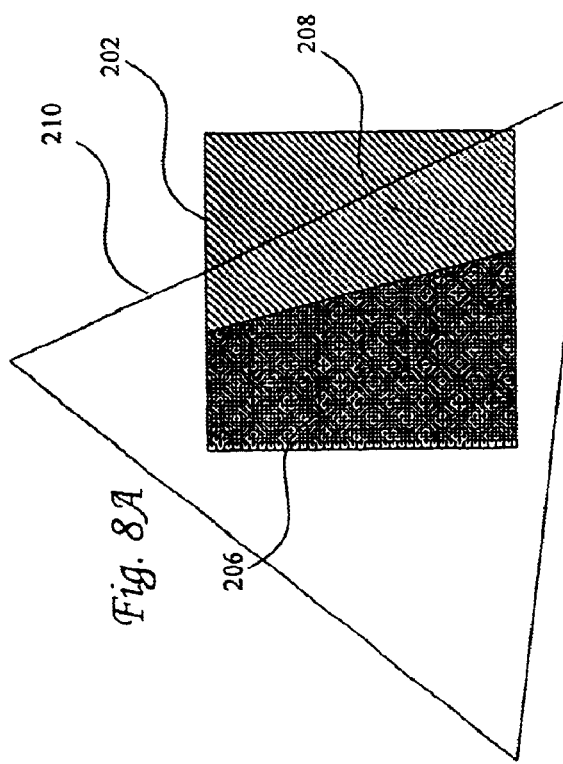
Fig. 8A
Fig. 8B

Fig. 17A

RMASK for an 8x8 display block 202

SUB-BLOCK 0 →

SUB-BLOCK 1 →

SUB-BLOCK 2 →

SUB-BLOCK 3 →

| 1 | 1 | 1 | 0 | 0 | 0 | 0 | 0 |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 0 | 0 | 0 |
| 1 | 1 | 1 | 1 | 1 | 0 | 0 | 0 |

Fig. 17B

CMASK for a current triangle 221

| 0 | 1 | 0 | 0 | 0 | 0 | 0 | 0 |
|---|---|---|---|---|---|---|---|
| 0 | 1 | 1 | 0 | 0 | 0 | 0 | 0 |
| 0 | 1 | 1 | 1 | 0 | 0 | 0 | 0 |
| 0 | 1 | 1 | 1 | 1 | 0 | 0 | 0 |
| 1 | 1 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 17C

RZMASK = CMASK

Correspond to SUB-BLOCK 0 → ZTEST[0]=[1]

Correspond to SUB-BLOCK 1 → ZTEST[1]=[1]

Correspond to SUB-BLOCK 2 → ZTEST[2]=[1]

Correspond to SUB-BLOCK 3 → ZTEST[3]=[0]

| 0 | 1 | 0 | 0 | 0 | 0 | 0 | 0 |
|---|---|---|---|---|---|---|---|
| 0 | 1 | 1 | 0 | 0 | 0 | 0 | 0 |
| 0 | 1 | 1 | 1 | 0 | 0 | 0 | 0 |
| 0 | 1 | 1 | 1 | 1 | 0 | 0 | 0 |
| 1 | 1 | 1 | 1 | 1 | 1 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

=> ZTEST[0..3]=[1110]

Fig. 18A

RMASK for an 8x8 display block 202

SUB-BLOCK 0 →

SUB-BLOCK 1 →

SUB-BLOCK 2 →

SUB-BLOCK 3 →

| 1 | 1 | 1 | 0 | 0 | 0 | 0 | 0 |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 0 | 0 | 0 |
| 1 | 1 | 1 | 1 | 1 | 0 | 0 | 0 |

Fig. 18B

CMASK for a current triangle 238

| 0 | 0 | 0 | 1 | 1 | 1 | 1 | 1 |
|---|---|---|---|---|---|---|---|
| 0 | 0 | 0 | 1 | 1 | 1 | 1 | 1 |
| 0 | 0 | 1 | 1 | 1 | 1 | 1 | 1 |
| 0 | 0 | 1 | 1 | 1 | 1 | 1 | 1 |
| 0 | 1 | 1 | 1 | 1 | 1 | 1 | 1 |
| 0 | 1 | 1 | 1 | 1 | 1 | 1 | 1 |
| 0 | 1 | 1 | 1 | 1 | 1 | 1 | 1 |
| 1 | 1 | 1 | 1 | 1 | 1 | 1 | 1 |

Fig. 18C

RZMASK = CMASK & RMASK

Correspond to SUB-BLOCK 0 → ZTEST[0]=[0]

Correspond to SUB-BLOCK 1 → ZTEST[1]=[1]

Correspond to SUB-BLOCK 2 → ZTEST[2]=[1]

Correspond to SUB-BLOCK 3 → ZTEST[3]=[1]

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 1 | 0 | 0 | 0 | 0 | 0 |
| 0 | 0 | 1 | 1 | 0 | 0 | 0 | 0 |
| 0 | 1 | 1 | 1 | 0 | 0 | 0 | 0 |
| 0 | 1 | 1 | 1 | 0 | 0 | 0 | 0 |
| 0 | 1 | 1 | 1 | 1 | 0 | 0 | 0 |
| 1 | 1 | 1 | 1 | 1 | 0 | 0 | 0 |

=> ZTEST[0..3]=[0111]

Fig. 19A

RMASK for an 8x8 display block 202

SUB-BLOCK 0 →

SUB-BLOCK 1 →

SUB-BLOCK 2 →

SUB-BLOCK 3 →

| 1 | 1 | 1 | 0 | 0 | 0 | 0 | 0 |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 0 | 0 | 0 |
| 1 | 1 | 1 | 1 | 1 | 0 | 0 | 0 |

Fig. 19B

CMASK for a current triangle 250

| 0 | 0 | 0 | 1 | 0 | 0 | 0 | 0 |
|---|---|---|---|---|---|---|---|
| 0 | 0 | 1 | 1 | 1 | 0 | 0 | 0 |
| 0 | 0 | 1 | 1 | 1 | 0 | 0 | 0 |
| 0 | 0 | 1 | 1 | 1 | 1 | 0 | 0 |
| 0 | 1 | 1 | 1 | 1 | 1 | 0 | 0 |
| 0 | 1 | 1 | 1 | 1 | 1 | 0 | 0 |
| 0 | 1 | 1 | 1 | 1 | 1 | 1 | 0 |
| 1 | 1 | 1 | 1 | 1 | 1 | 1 | 1 |

Fig. 19C

RZMASK = CMASK & ~RMASK

Correspond to SUB-BLOCK 0 → ZTEST[0]=[1]

Correspond to SUB-BLOCK 1 → ZTEST[1]=[1]

Correspond to SUB-BLOCK 2 → ZTEST[2]=[1]

Correspond to SUB-BLOCK 3 → ZTEST[3]=[1]

| 0 | 0 | 0 | 1 | 0 | 0 | 0 | 0 |
|---|---|---|---|---|---|---|---|
| 0 | 0 | 0 | 1 | 1 | 0 | 0 | 0 |
| 0 | 0 | 0 | 1 | 1 | 0 | 0 | 0 |
| 0 | 0 | 0 | 0 | 1 | 1 | 0 | 0 |
| 0 | 0 | 0 | 0 | 1 | 1 | 0 | 0 |
| 0 | 0 | 0 | 0 | 0 | 1 | 1 | 0 |
| 0 | 0 | 0 | 0 | 0 | 1 | 1 | 0 |
| 0 | 0 | 0 | 0 | 0 | 1 | 1 | 1 |

=> ZTEST[0..3]=[1111]

Fig. 20A

RMASK for an 8x8 display block 202

| 1 | 1 | 1 | 0 | 0 | 0 | 0 | 0 |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 1 | 0 | 0 | 0 |
| 1 | 1 | 1 | 1 | 1 | 0 | 0 | 0 |

| SB0' | SB1' | SB2' | SB3' |

Fig. 20B

CMASK for a current triangle 250

| 0 | 0 | 0 | 1 | 0 | 0 | 0 | 0 |
|---|---|---|---|---|---|---|---|
| 0 | 0 | 1 | 1 | 1 | 0 | 0 | 0 |
| 0 | 0 | 1 | 1 | 1 | 0 | 0 | 0 |
| 0 | 0 | 1 | 1 | 1 | 1 | 0 | 0 |
| 0 | 1 | 1 | 1 | 1 | 1 | 0 | 0 |
| 0 | 1 | 1 | 1 | 1 | 1 | 1 | 0 |
| 0 | 1 | 1 | 1 | 1 | 1 | 1 | 0 |
| 1 | 1 | 1 | 1 | 1 | 1 | 1 | 1 |

Fig. 20C

RZMASK = CMASK & ~RMASK

Correspond to SUB-BLOCK 0' → ZTEST[0]=[0]

Correspond to SUB-BLOCK 1' → ZTEST[1]=[1]

Correspond to SUB-BLOCK 2' → ZTEST[2]=[1]

Correspond to SUB-BLOCK 3' → ZTEST[3]=[1]

=> ZTEST[0..3]=[0111]

| 0 | 0 | 0 | 1 | 0 | 0 | 0 | 0 |
|---|---|---|---|---|---|---|---|
| 0 | 0 | 0 | 1 | 1 | 0 | 0 | 0 |
| 0 | 0 | 0 | 1 | 1 | 0 | 0 | 0 |
| 0 | 0 | 0 | 0 | 1 | 0 | 0 | 0 |
| 0 | 0 | 0 | 0 | 1 | 1 | 0 | 0 |
| 0 | 0 | 0 | 0 | 0 | 1 | 1 | 0 |
| 0 | 0 | 0 | 0 | 0 | 1 | 1 | 0 |
| 0 | 0 | 0 | 0 | 0 | 1 | 1 | 1 |

| SB0' | SB1' | SB2' | SB3' |

APPARATUS AND METHOD FOR REDUCING THE MEMORY TRAFFIC OF A GRAPHICS RENDERING SYSTEM

FIELD OF THE INVENTION

The present invention relates to computer graphics generation and display, and more particularly, to computer graphics generation display with reduced need for accessing a z-buffer during the generation and display of graphical images.

BACKGROUND OF THE INVENTION

A computer graphics display system allows displays of graphical images on pixel-oriented output devices. FIG. 1 is a simplified, semi-schematic block diagram of one such exemplary system. As illustrated in FIG. 1, the system comprises a processor 10, a frame buffer 12, a display monitor 14, and a display controller 16. The display monitor 14 includes a screen which displays a plurality of pixels. A pixel is generally the smallest addressable element in an electronic display. Individual pixels on a screen are addressed using x and y coordinates, in a similar manner as points on a graph or matrix are addressed. Frame buffer 12 resides in main memory 18 and stores a pixel number map corresponding to a graphical image. The pixel number map can be represented by a grid-like (or matrix-like) array of pixels where each pixel is assigned a color and a shade value.

When designing a display system, it is important to consider the human eye. The human eye has three types of photoreceptor cells called cones. Each of the three types of cones responds differently to light of different wavelengths. Accordingly, light with different wavelength content is perceived as light of different color. Color display systems have existed for a long time with knowledge of how human perception works; however, the manner of displaying colors on electronic systems continues to develop.

A basic color display system uses an RGB color system. In such a system, R corresponds to a red color source, G to a green color source and B to a blue color source. By selecting the wavelength content of the RGB color sources, a color gamut is achieved. Thus by blending or combining different amounts of either the red, green, or blue source, a wide range of colors can be achieved. From this color gamut, it is therefore important to mathematically represent a color from a set of colors. Such mathematical representation is called a color space.

RGB is an additive color system where the three primary colors red, green, and blue are added to form a desired color. In a typical RGB color space each component has a range of 0 to 255. When the three sources are at zero, the resulting color is black; when the three sources are at 255, the resulting color is white.

For an RGB color system, an RGB color space can be used. There are, however, other color spaces available including YIQ, YUV, YCbCr, and CMYK. Mathematical conversions are available to convert from one color space to another. Of particular interest in the present invention, is the YCbCr color space which is commonly used in broadcast and television systems as well as computer graphics implementations.

Different color spaces have historically evolved for different applications. In each case, a color space was chosen for reasons that may no longer be applicable. A choice may have been made on a particular color space because certain mathematical elements were simpler or faster to process. A choice may have been made because of reduce memory requirements or because of reduced bandwidth on digital buses.

With regard to the YCbCr color space, it was developed as part of the Recommendation ITU-R BT.601 as a worldwide digital component video standard and is used in television transmissions. YCbCr is a scaled and offset version of the YUV color space where Y represents luminance (or brightness), U represents color, and V represents the saturation value. In the YCbCr color space, the RGB color space is separated into a luminance part, Y, and two chrominance parts, Cb and Cr. A historical reason for choosing YCbCr over RGB is that YCbCr reduces storage and bandwidth requirements.

In developing the YCbCr color space, it was considered that the human eye is more sensitive to change in brightness than change in color. Engineers found that 60 to 70 percent of luminance or brightness is found in the "green color." Accordingly, in the chrominance parts, Cb and Cr, the brightness information can be removed from the blue and red colors.

To generate the same color in the RGB format, all three color components should be of equal bandwidth. This requires more storage space and bandwidth. Also, processing an image in the RGB space is more complex since any change in the color of any pixel requires all the three RGB values to be read, calculations performed, and then stored. However, the color information is stored in the intensity and color format, some of the processing steps can be made faster. The result is that Cb and Cr provide the hue and saturation information of the color and Y provides the brightness information of the color. Y is defined to have a range of 16 to 235 and Cb and Cr have a range of 16 to 240 with 128 equal to zero. Because the human eye is less sensitive to Cb and Cr, engineers did not need to transmit Cr and Cb at the same rate as Y. Less storage and bandwidth was needed, resulting in reduced design costs.

Thus, where storage and bandwidth are a design consideration, as in many modem digital graphic systems, the YCbCr color space is preferred. Within the YCbCr color space there are various formats including the 4:4:4, 4:2:2, 4:1:1, and the 4:2:0 formats. These various formats provide different levels of compression with certain tradeoffs. The 4:2:0 format, in particular, provides certain compression advantages, but because of the manner in which it is implemented, memory bandwidth becomes a problem. Display systems that implement the 4:2:0 format typically use paged memory devices (e.g., SRAM or DRAM) where the Y, Cb, and Cr information are stored in different pages of memory. Moreover, a typical system retrieves information for two pixels at a time by retrieving two items of Y information, and one item each of Cb and Cr information. Thus, retrieving color information for a pair of pixels in a prior art system, requires three page breaks. It is therefore desirable to provide a computer display system that provides improved memory bandwidth. It is further desirable to provide a computer display system that reduces the number of required memory page breaks to display an image.

Returning to the discussion of FIG. 1, processor 10 computes and updates the pixel values in frame buffer 12 when a new graphical image is to be displayed. During the display process, display controller 16 acts as an interface between frame buffer 12 and display monitor 14 by taking the pixel values in frame buffer 12 and converting them to a video signal for rendering on display 14.

In processing a three-dimensional graphical object, the depth attribute, often called a z-value, of the object must be considered prior to the updating of any pixel values in frame buffer 12. Consider that if the new object being processed is located behind and is partially obscured by the displayed object, only a visible portion of the new object should be displayed. But if the new object is completely obscured by the displayed object, no updates to frame buffer 12 are necessary and the new object is not rendered on display 14.

Three-dimensional objects are often represented by a set of vertices defining polygonal surfaces. Each vertex is defined by its x, y, and z dimensions corresponding to abstract X-, Y-, and Z-axes. Notably, the X- and Y-axes define a view plane and the Z-axis represents a distance from the view plane. A z-coordinate value, therefore, indicates a depth of an object at a pixel location defined by specific x and y coordinates. Generally speaking, it represents a distance from a viewpoint such as an abstract distance from a person viewing display 14.

Further referring to FIG. 1, z-buffer 20 is configured to store z-values for each pixel, that is, the depth value of each pixel. With these z-values a depth analysis of a three-dimensional object can be performed. This analysis is often referred to as a hidden surface removal process. Because hidden surfaces will not be rendered on display 14, they can be removed from consideration. For example, when a new object moves into a displayed portion of a view plane, a determination is to be made as to whether the new object is visible and should be displayed, or whether the new object is hidden by objects already in the displayed portion of the view plane such that it will not be displayed. Prior art systems have generally made a determination of whether a new object should be displayed on a pixel-by-pixel basis. Thus, for each pixel to be rendered, defined by its x, y coordinates, the depth (i.e., z-value) of the new object is compared to the depth (i.e., z-value) of the currently displayed object.

For example, if a comparison indicates that the new pixel to be drawn is in front of the old pixel in z-buffer 20 (i.e., the new z-value is less than the old z-value), the old z-value is replaced with the new z-value, and the color system (e.g., RBG or YCbCr) parameters for the new pixel are written to frame buffer 12 for display in the place of the old pixel. Conversely, if the new pixel is located behind the old pixel (i.e., the new z-value is greater than the old z-value), it will be hidden from view and need not be displayed. In this situation, the old z-value is kept in the z-buffer and the new z-value is discarded. That is, the old pixel remains displayed and is not replaced by the new pixel.

There are several disadvantages to the above prior art process. First, initializing each pixel in z-buffer 20 to a constant value (generally the value of the background) is expensive in terms of time and memory bandwidth. Furthermore, the pixel-by-pixel analysis during the display of an object requires a z-buffer read for each pixel to compare the z-value of the old pixel with respect to the new pixel. Because z-buffers are large and cannot be stored on-chip, thereby requiring external memory access, z-comparisons significantly slow down the rendering process. In addition, significant computational cycles are expended in performing pixel-by-pixel comparisons. Accordingly, there is a need for a system and method for computer graphics generation and display that will perform hidden surface removal with less computation cycles and memory bandwidth waste.

SUMMARY OF THE INVENTION

The present invention specifically addresses and alleviates the above-mentioned deficiencies associated with the prior art. More particularly, the present invention comprises an apparatus to be used within a computer graphics display system that eliminates the initialization of a z-buffer. In addition, the system, through the use of the present invention, performs z-comparisons on groups of pixels rather than computationally intensive pixel-by-pixel comparison in order to reduce the number of z-buffer accesses for performing image rendering.

A method in accordance with the present invention is a method of rendering a graphics primitive to a frame buffer for a display, where the frame buffer is partitioned into a plurality of equal size blocks of pixels and each block has at least two depth-layers, and where the frame buffer has an associated z-buffer with an depth value for each pixel in the frame buffer and the depth value determines the visibility of a pixel on the display. The method includes the following steps. The blocks in the frame buffer that are affected by the graphics primitive are determined. For each affected block, the depth layers of the block are adjusted, and whether any pixels of the graphics primitive for the block intersect any of the depth-layers of the block is determined, the block being partitioned into a plurality of equal size sub-blocks and having a sub-block mask that includes a bit for each sub-block. If any pixels of the graphics primitive for the block intersect any of the depth-layers, a flag is set indicating that the z-buffer requires an update for the block, a pixel mask is formed that indicates which pixels in the block are intersecting pixels, and the pixel mask is combined with the sub-block mask to determine which sub-blocks have intersecting pixels. The blocks in the frame buffer that are affected by the graphics primitive are again determined. For each affected block, the depth layers of the block are adjusted, and whether or not there is an update flag set for the block is determined. If there is no update flag set, the visible pixels are rendered to the frame buffer based on the adjusted depth layers. If the update flag is set, then for each sub-block of the affected block, whether the sub-block is affected by any intersecting pixels is determined based on the sub-block mask. If the sub-block is affected, the z-buffer is read, the visibility entry for the intersecting pixels is adjusted, and any visible pixels are rendered to the frame buffer.

In another embodiment of the invention, the type of polygon used is a triangle. In yet another aspect of the invention, each block has two layers corresponding to a front layer and a back layer, each layer having depth values ranging from a minimum depth value to a maximum depth value wherein the extrema values are stored, for example in a z-range buffer.

One embodiment of the invention is graphic rendering apparatus that includes a frame buffer, a z-buffer, and a graphics processor. The graphics processor includes a z-range buffer, a first register, a second register and a flag. The frame buffer is operative to store pixels to be displayed and is partitioned into a plurality of equal size blocks of pixels, and each block is partitioned into a plurality of equal size sub-blocks. The z-buffer is associated with the frame buffer and stores a depth value for each pixel in the frame buffer. The depth value determines the visibility of a pixel on the display. The graphics processor is operative to process the pixels of the z-buffer and frame buffer. The z-range buffer has fields for indicating for a block a depth range for a front layer, a depth range for a back layer, a mask indicting which pixels in the block are in the front layer and back layer; and a field for storing sub-block information that indicates whether or not the z-buffer must be read for the sub-block. The first register has fields for indicating which pixels in a block are affected by a graphics primitive and for indicating the depth range of the pixels in the block affected by the graphics primitive. The second register has a field for indicating which pixels in the block require the z-buffer to be read, and a flag indicating that the z-buffer must be read for a block. The graphics processor is configured to: (i) determine which pixels in a block are affected by a graphics primitive and the depth range of the pixels in a block affected by the graphics primitive and to set the fields in the first register accordingly; (ii) determine whether the pixels in a block affected by a graphics primitive intersect the front layer, the back layer or both layers; (iii) set the flag if the z-buffer must be read for a block; (iv) adjust the ranges of the front and back layers in the z-range buffer based on the pixels in a block affected by the graphics primitive and the depth range of the affected pixels; (v) if the flag is not set, render visible pixels to the frame buffer depending on the adjusted front and back layers; (vi) if the flag is set, determine which pixels in the block require the z-buffer to be read and setting the field in the second register accordingly based on the intersection determination, determine which sub-blocks in the block require the z-buffer to be read and set the field in the z-range buffer accordingly, read the z-buffer to obtain the depth values for the sub-block, and render the visible pixels to the frame buffer depending on the depth values obtained for the sub-block.

In this way, read operations are significantly reduced through the implementation of certain z-range buffer algorithms of the present invention. Moreover, where no conflict is present within a sub-block, z-buffer operations are eliminated. Many rendering calculations are also eliminated. The present invention will be more fully appreciated upon understanding the detailed description below

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 8A–8D are exemplary illustrations of a triangle closer to the viewpoint than a front layer and covering at least all the pixels of the front layer;

FIGS. 17A–17C are exemplary illustrations of the formation of a read z-buffer mask RZMASK wherein RZMASK= CZMASK, and the associated ZTEST value;

FIGS. 18A–18C are exemplary illustrations of the formation of a read z-buffer mask RZMASK wherein RZMASK= CZMASK & RZMASK, and the associated ZTEST value;

FIGS. 19A–19C are exemplary illustrations of the formation of a read z-buffer mask RZMASK wherein RZMASK= CZMASK & ~RZMASK, and the associated ZTEST value; and FIGS. 20A–20C are exemplary illustrations of the formation of a read z-buffer mask RZMASK wherein RZMASK, CZMASK, and RZMASK are the same as those shown in FIGS. 20A–20C, and the associated ZTEST value of sub-blocks differently selected than those of FIGS. 20A–20C.

DETAILED DESCRIPTION OF THE PREFERRED EMBODIMENTS

Figure 1:
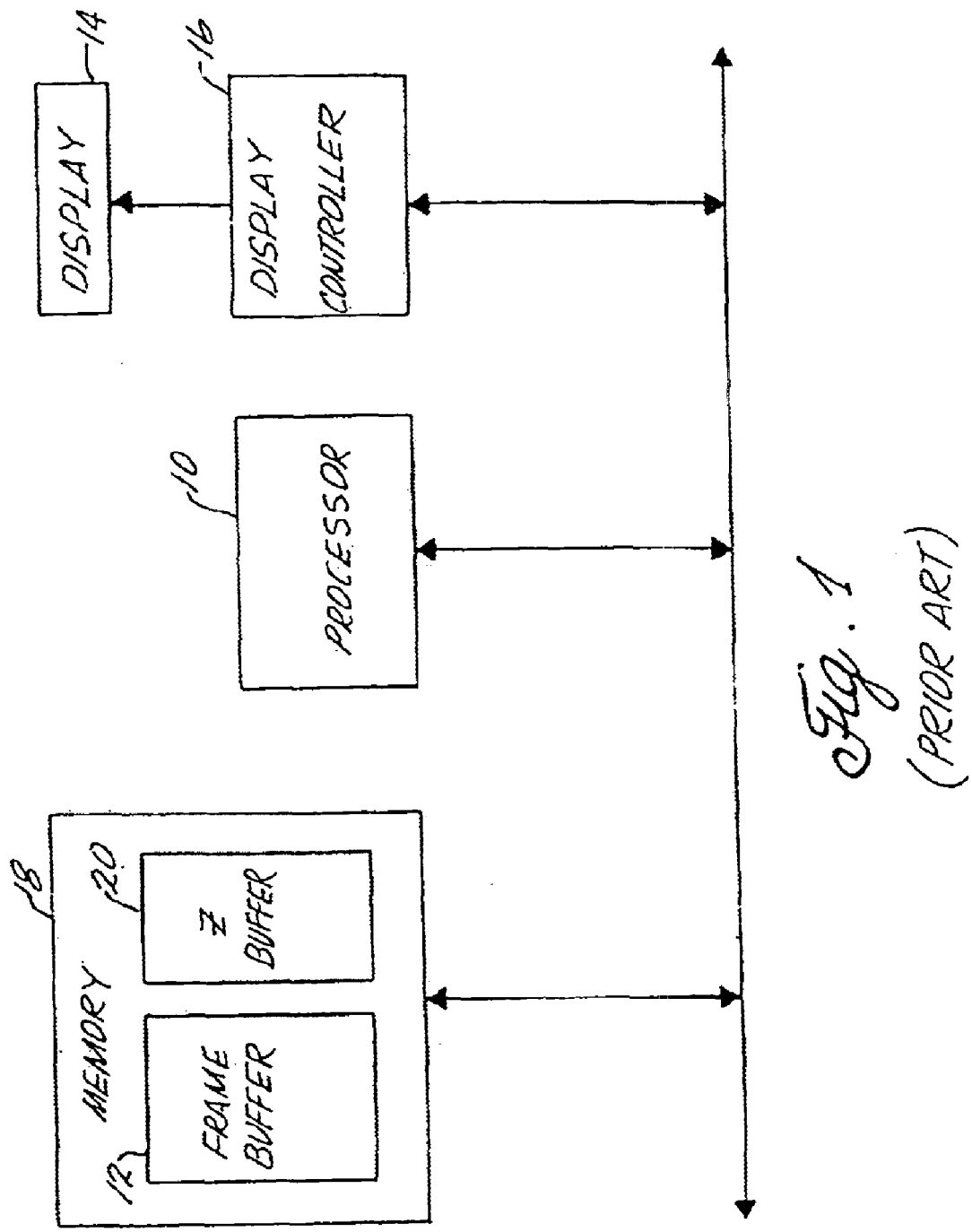
FIG. 1 is a simplified, semi-schematic block diagram of an exemplary graphics display system according to the prior art.

In general terms, the present invention provides a system and method for reducing the number of performance reducing z-buffer accesses during the generation and display of a three-dimensional graphical object. This is accomplished by identifying minimum and maximum depth values (i.e., z-values) of a group of pixels making up the object. Z-comparisons are then performed on extrema (i.e., minimum and/or maximum) z-values rather than on all the z-values in the group thereby achieving savings in computational cycles. Memory bandwidth is also conserved because no z-read requests need be submitted to display controller 16 (FIG. 1). By making z-comparisons on the extrema z-values only, accurate generalizations of the z-values of the remaining pixels in the group are possible. If such generalization cannot be made, pixel-by-pixel z-comparisons of all the pixels in the group are then performed. Because pixel-by-pixel comparisons will generally only be necessary for a several display blocks, increased performance is nevertheless achieved.

In the described embodiment, three-dimensional objects are represented by a set of vertices defining triangular surfaces. However, those skilled in the art will appreciate that other types of polygons, including circles, squares, pentagons, or hexagons, can be used to represent a three-dimensional object. One of skill in the art is able to extend the teachings of the present disclosure to other types of polygons.

Figure 2:
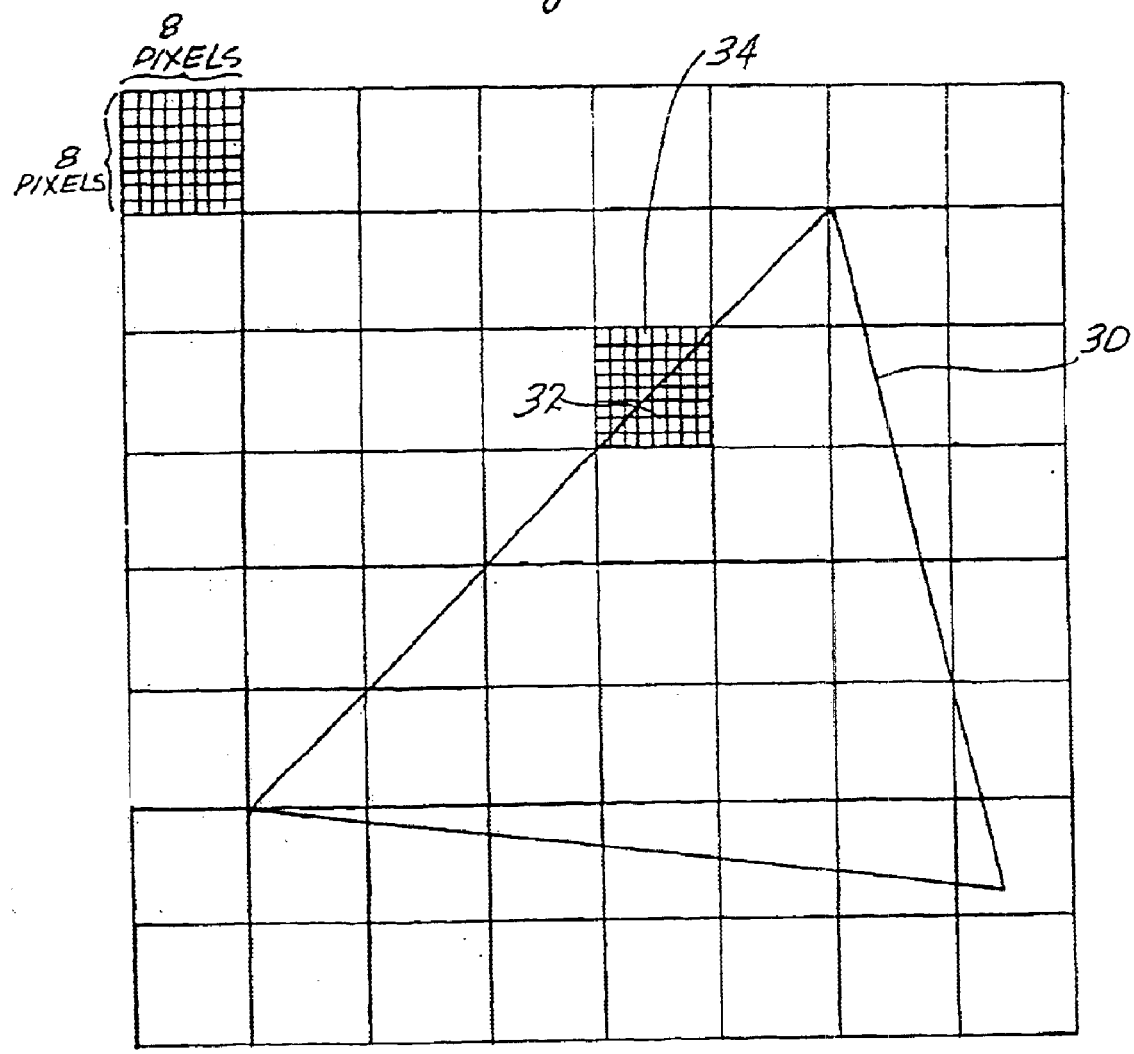
FIG. 2 is a simplified, semi-schematic diagram of an exemplary display system partitioned into 8 by 8 pixel display blocks.

In accordance with an embodiment of the invention, a display screen is partitioned into one or more display blocks. The depth characteristic of each block is then explored. FIG. 2 is an exemplary screen partitioned into display blocks of 8 pixels by 8 pixels (8×8) containing 64 pixels. Alternative dimensions may also be utilized, such as 8×4, 16×4, 4×8, 4×4, or 16×8 blocks.

In an embodiment, each pixel in a display block is associated with either a front layer or a back layer. The front layer is comprised of pixels associated with a foreground of the screen; the back layer is comprised of pixels associated with a background of the screen. As a convention, if only one layer is present in the display block, it is represented as the back layer instead of the front layer. Initially, a block is empty and all pixels belong to a background that is represented as the back layer. As a new polygon, a triangle in the embodiment being described, is introduced to the display block for possible display, the system compares the extrema of z-value and, in effect, the range of z-values for the new triangle. The z-ranges to be compared are for the front and/or back layers. In this way, the system determines the pixels in the new triangle which are visible and the pixels that are obscured by other triangles already in the display block.

Generally speaking, if the z-values of the current triangle do not intersect the z-ranges of a front layer and/or a back layer, the visible pixels in the display block, whether it is an already displayed triangle or the new triangle, can be identified without performing z-buffer reads. The term "intersect" here refers to the z-range of the current triangle or image in the display block overlaps the z-range of either the front layer or the back layer or both. On the other hand, if the z-ranges do intersect, conventional pixel-by-pixel z-comparisons are generally performed to determine which pixels of the new triangle are in front of the already displayed triangle and which pixels are hidden by the already displayed triangle. The pixels in the new triangle are then associated with either the front layer or the back layer.

Conventionally, if a pixel is in front of the front layer, it is associated with the front layer. If a pixel is between the front layer and the back layer, it is generally associated with the closer of the two layers. If a pixel is behind a back layer, it becomes associated with the back layer. For instance, if the new triangle is located in front of the front layer, all of the pixels in the new triangle are visible and should be displayed. If this triangle does not cover all the pixels in the block, it will then be associated with the front layer for the block.

Group z-comparisons are accomplished through a z-range buffer (range buffer) comparisons. In contrast to the z-buffer which stores the z-value of each pixel, the range buffer stores only four z-values for a display block: (1) a minimum z-value of a front layer of the block, (2) a maximum z-value of the front layer of the block, (3) a minimum z-value of a back layer of the block, and (4) a maximum z-value of the back layer of the block. In addition, the range buffer stores a bitmask for the pixels in the block, indicating whether a specific pixel belongs to the front layer or the back layer. Because the z-range buffer is sufficiently compact to reside on-chip, no external reads to memory are required. This dramatically increases processing speed and decreases bus traffic.

In accordance with an embodiment of the invention, each display block is partitioned into several display sub-blocks. The display block can be partitioned into display sub-blocks of 2 pixels by 8 pixels (2×8) containing 16 pixels. Alternative dimensions may also be utilized, such as 2×2, 2×4, 2×16, 8×4, 16×4, 4×8, 4×4, or 16×8 blocks. FIGS. 17–20 show some examples of 2×8 and 8×2 sub-blocks.

Figure 3:
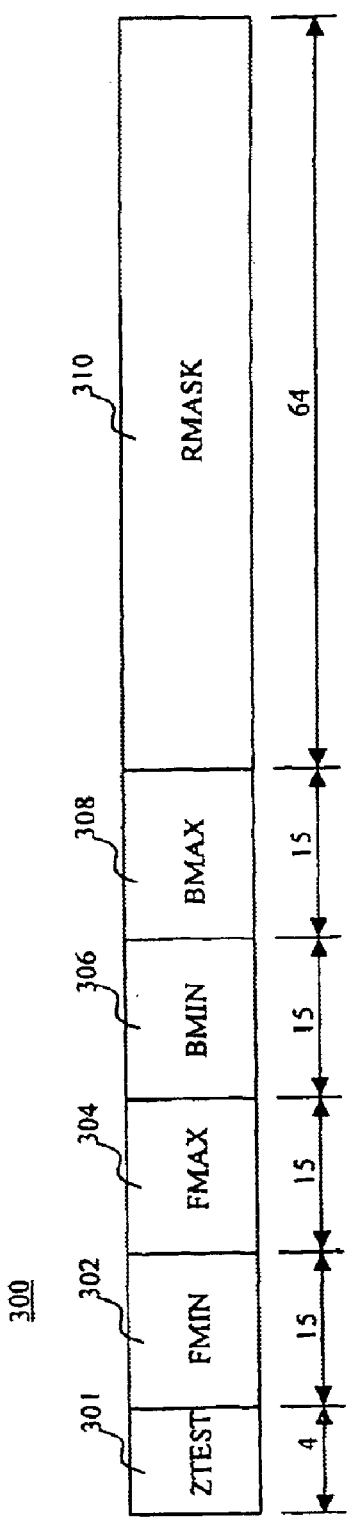
FIG. 3 is a conceptual layout diagram of a z-range buffer in accordance with practice of the present invention.

FIG. 3 is a diagram of a generalized range buffer just described. An FMIN field 302 and an FMAX field 304 store minimum and maximum z-values, respectively, of the front layer of a display block. Similarly, a BMIN field 306 and a BMAX field 308 store minimum and the maximum z-values, respectively, of the back layer of a display block. In the embodiment of FIG. 3, the FMIN, FMAX, BMIN, and BMAX fields 302–308, respectively, each occupy fifteen (15) bits of storage space. A pixel mask field RMASK 310 occupies 64 bits of storage space, with each bit corresponding to a pixel in an 8×8 block. Each bit of RMASK field 310 is set to either a "0" or a "1" based on whether the corresponding pixel belongs to the back layer or the front layer, respectively, of the display block. A ZTEST field 301 of 4 bits is provided for storing sub-block information of the block 34, in which a bit value of "1" indicates performing z-buffer reading is necessary for the corresponding sub-block and a bit value "0" indicates performing z-buffer reading is not necessary. The ZTEST field will be further explained later.

Figure 4A:
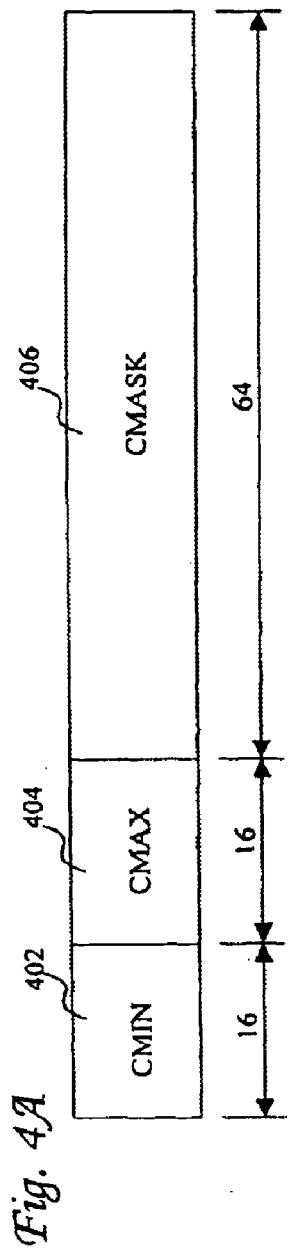
FIG. 4A is a conceptual layout diagram of a data structure of a pixel mask for storing minimum and maximum z-values and bitmask values of a triangle in a display block.
Figure 4B:
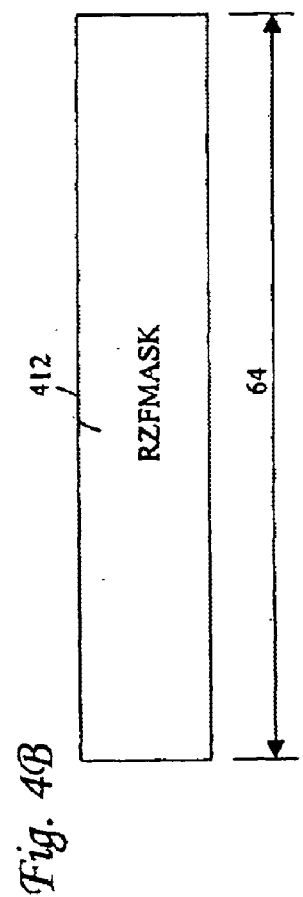
FIG. 4B is a conceptual layout diagram of a data structure of a read-z-buffer mask for storing bitmask values of a triangle in a display block.

FIG. 4A is a diagram of a generalized data structure for storing minimum and maximum z-values and bitmask values of a new triangle 30 of FIG. 2 with reference to display block 34. A CMIN field 402 and a CMAX field 404 respectively represent the minimum and maximum z-values of pixels in the block 34 affected by triangle 30. The CMIN and CMAX fields 402 and 404, respectively, each occupy 16 bits of storage space. CMASK field 406 is bitmask representing the pixels 32 in the display block 34 touched by the triangle 30. CMASK field 406 occupies 64 bits of storage space. FIG. 4B is a diagram of a generalized data structure for storing bitmask values of the current triangle 30 of FIG. 2 associated with display block 34 that need performing z-buffer reading.

It is important to note that the disclosure of the present invention can be extended to implementations using more than two layers. For example, the teachings of the present invention can be extended for use in a system using four layers of display. In such a system, the range buffer could be configured with four pairs of extrema values. Moreover, in such a system, the bitmask would be configured to comprise at least two bits per pixel. Accordingly, for a 64 pixel display block, for example, an appropriate bitmask would have at least 128 bits associated with it (i.e., two bits per pixel). The range buffer and bitmask for the new image could similarly be modified. Indeed, one of skill in the art could vary the teachings of the present invention without deviating from the invention itself.

Figure 5:
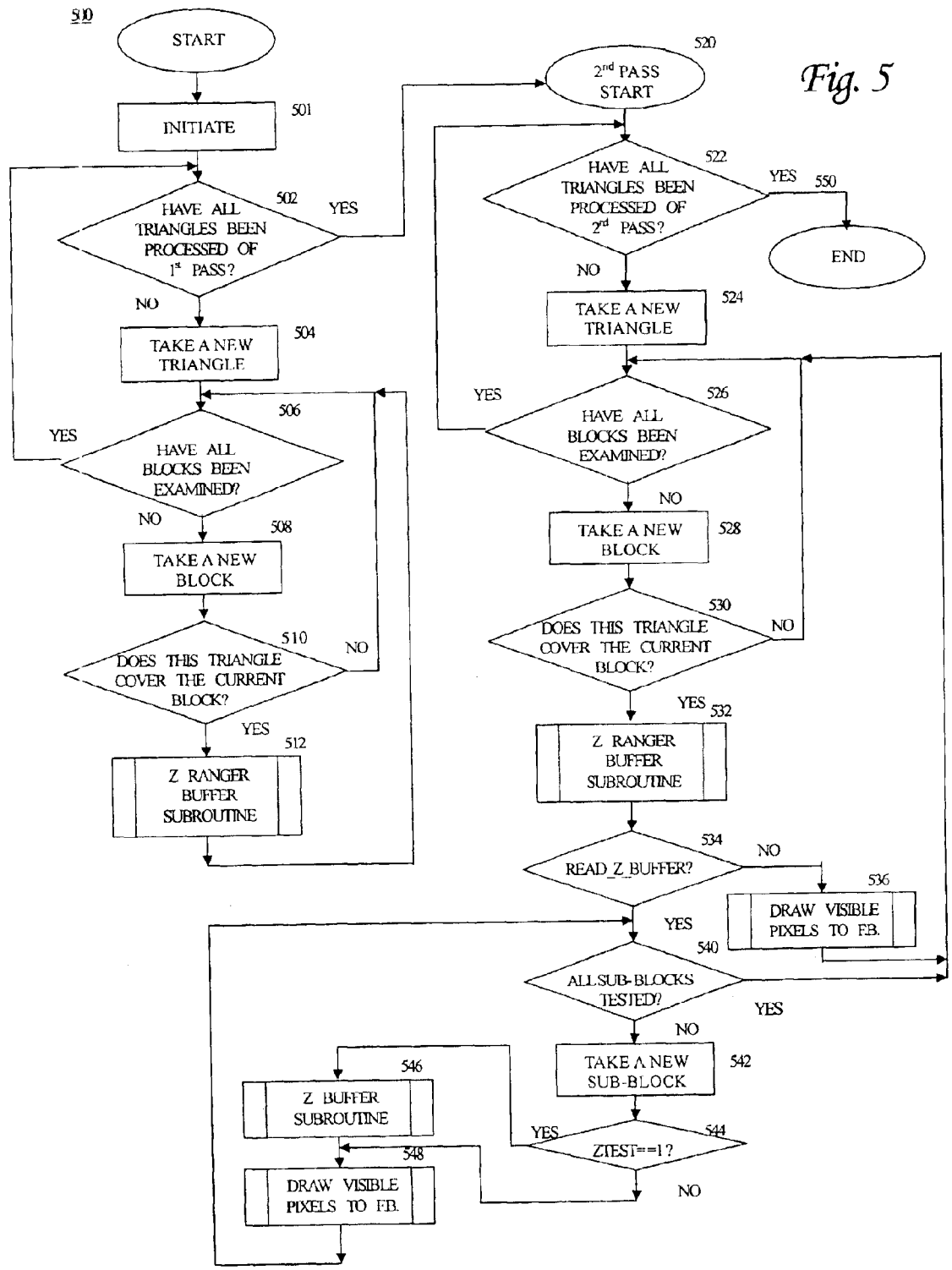
FIG. 5 is a process flow diagram of a computer graphics display routine in accordance with practice of the present invention.

FIG. 5 is an exemplary flow diagram of a process 500 according to the embodiment being described. Process 500 is described in terms of a computer program routine, but those of skill in the art recognize that the process can also be implemented using logic circuitry in order to more rapidly complete the process. Indeed, an embodiment of the present invention is implemented in a digital circuit topology. The digital circuit topology is comprised of logic gates and memory elements, with the logic gates and memory elements forming a z-range buffer in a single integrated circuit thereby providing dramatic improvements in performance when compared to the prior art.

Process 500 of FIG. 5 begins with an empty screen and initializes (step 501) the FMIN, FMAX, BMIN, and BMAX values of each block to the maximum possible z-value, i.e., the z-value of the background. In the described embodiment, the maximum z-value is "1.0" and the minimum z-value is "0.0." Accordingly, the permissible z-values range over a normalized set of values between 0.0 and 1.0, inclusively. Those skilled in the art will recognize that other ranges could also be used. The RMASK field for each block is also initialized to 0, depicting that all the pixels belong to the back layer which is initially the background, i.e., each pixel of the RMASK field is set to 0. ZTEST field for each sub-block is also initialized to 0, depicting that no sub-block is marked requiring performing READ-Z-BUFFER subroutine.

The process next inquires whether all the triangle surfaces making up a three-dimensional object to be drawn have been processed of the first pass phase (step 502) to decide which sub-blocks require performing READ-Z-BUFFER subroutine and to mark the corresponding ZTEST fields as "1" (step 504~512). If they have, the process of the first pass phase ends and the second pass phase follows (step 520) to perform the Z BUFFER subroutine for necessary sub-blocks; i.e., those sub-blocks having corresponding ZTEST fields marked as "1" (step 522~548). Otherwise, the process takes a new triangle (step 504) as a current triangle and examines the display blocks covered by the current triangle (steps 506–512). If all the blocks have been examined as indicated by the YES branch of step 506, the next triangle is processed in step 504 if there are any more triangles to be examined in step 502. Otherwise, the process takes a new block (step 508) and inquires whether the current triangle covers a display block currently being examined (step 510). A Z-Range Buffer subroutine (step 512) is invoked upon an affirmative answer to give suitable values to the ZTEST fields. If the answer is negative, as indicated by the NO branch to decision diamond 510, the process advances to examine a next block in step 508 if there is any further block to be examined in step 506.

After all triangles are examined in the first pass phase, the process enters the second pass phase (step 520). The process next inquires whether all the triangle surfaces making up the three-dimensional object to be drawn have been processed of the second pass phase (step 522). If they have, the process of the second pass phase ends (step 550) and the pixel data in the frame buffer is ready for the display. Otherwise, the process takes a new triangle (step 524) as a current triangle and examines the display blocks covered by the triangle (steps 526–548). If all the blocks have been examined, as indicated by the YES branch of step 526, the next triangle is processed in step 524 if there are any more triangles to be examined in step 522. Otherwise, the process takes a new block (step 528) and inquires whether the current triangle covers a display block currently being examined (step 530). A Z-Range Buffer subroutine (step 532) is invoked upon an affirmative answer to decide read z-buffer or not. If the answer is negative, as indicated by the NO branch to decision diamond 534, the process advances to draw visible pixels to frame buffer (step 536) without performing the Z_BUFFER subroutine previously, and then go for a new block in step 528 if there is any further block to be examined in step 526. Otherwise, as indicated by the YES branch to decision diamond 534, the process advances to take a new sub-block (step 542) and examine the ZTEST value thereof (step 544) until all sub-blocks in the current block are examined (step 540). If ZTEST=1 in step 544, this means that READ_Z_BUFFER subroutine is necessary in the examined sub-block and leads to performing of the Z_BUFFER subroutine (step 546) to decide which pixels should be shown on the display (visible pixels) and thus draw them to the frame buffer (step 548). If ZTEST=0, which means we can decide the visible pixels without performing of the Z_BUFFER subroutine and draw them to the frame buffer directly in step 548.

As explained in further detail below, the Z-Range Buffer subroutine determines the ZTEST values for the sub-blocks in the second pass phase (step 532) and sets a READ-_Z_ BUFFER Boolean to either TRUE or FALSE, and performs Z_BUFFER subroutine for necessary sub-blocks. The READ_Z_BUFFER Boolean is used to determine if pixel-by-pixel z-comparisons are necessary. The ZTEST fields determine which sub-blocks require performing Z_BUFFER subroutine. The main process of FIG. 5 checks the READ_Z_BUFFER Boolean (step 534) after the execution of the Z-Range Buffer subroutine (step 532) to make this determination. If the READ_Z_BUFFER Boolean has been set to TRUE and the ZTEST=1 for a sub-block, the process invokes a Z-Buffer subroutine (step 546) for performing pixel-by-pixel comparisons. The process then proceeds to write the z-values of the pixels which are not hidden from view into the Z-Buffer (step 548) and draw those pixels in the place of the old pixels on the display. On the other hand, if the READ_Z_BUFFER Boolean has been set to FALSE, pixel-by-pixel comparisons of z-values are advantageously not necessary (refer to NO branch of step 534), but it is still necessary to draw visible pixels to the frame buffer (step 536). In an alternative embodiment, however, we can simply record the visible pixels in some way rather than draw them into the frame buffer (step 548 or 536) and draw them into the frame buffer later (not shown in the flow).

Figure 6A:
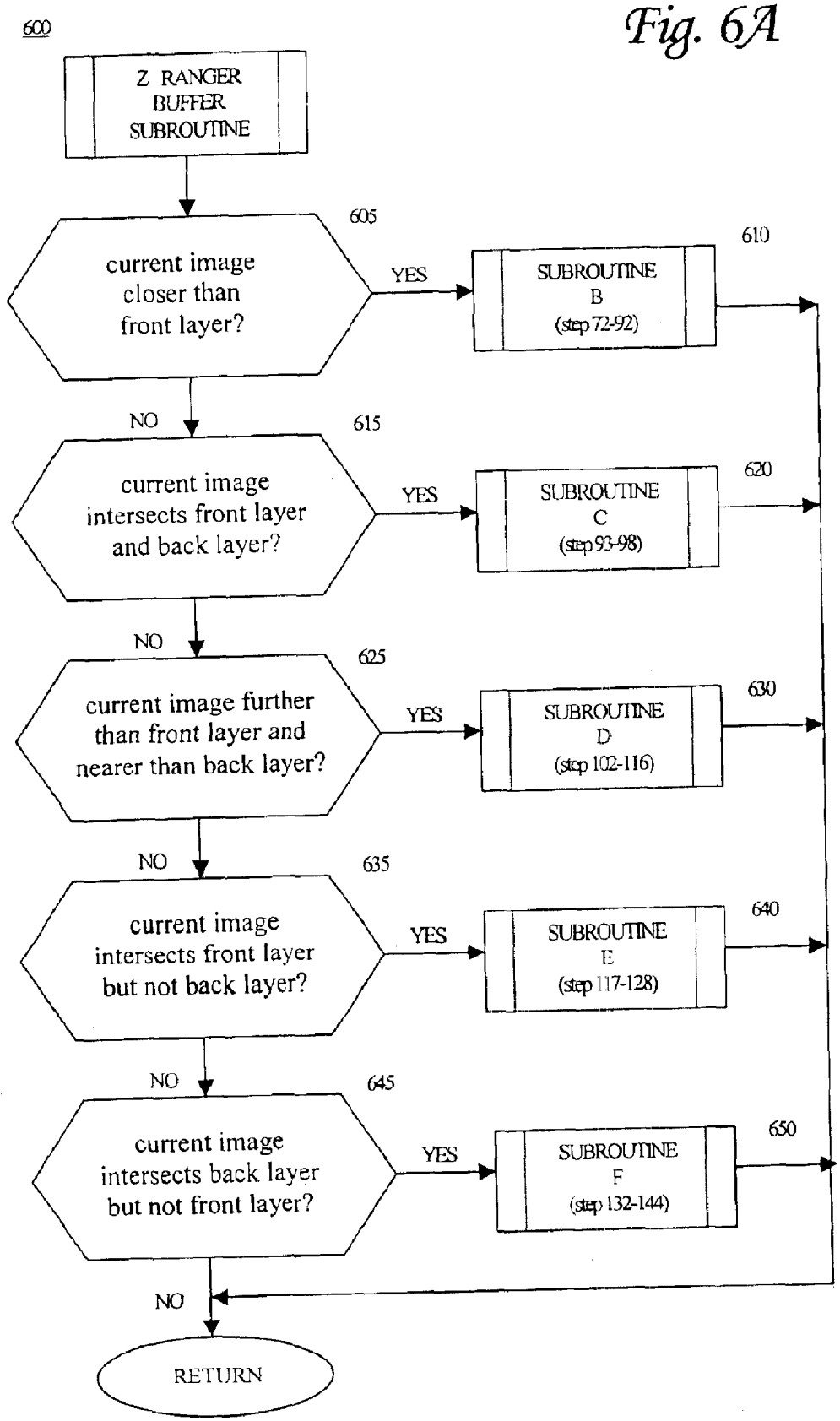
FIGS. 6A–6G are process flow diagrams of a Z-Range Buffer subroutine of FIG. 5.

FIGS. 6A–6G are exemplary process flow diagrams of the Z-Range Buffer subroutine 600 (steps 512, 532) of FIG. 5. FIG. 6A is the main flow diagram of the Z-Range Buffer subroutine 600 and begins by determining whether the current image to be drawn is closer than the front layer (step 605). If the answer is YES, perform subroutine B (step 610); otherwise, subroutine advances to determine whether the current image intersects both the front layer and the back layer (step 615). If the answer is YES, perform subroutine C (step 620); otherwise, subroutine advances to determine whether the current image is farther than the front layer and near than back layer (step 625). If the answer is YES, perform subroutine D (step 630); otherwise, subroutine advances to determine whether the current image intersects the front layer but not the back layer (step 635). If the answer is YES, perform subroutine E (step 640); otherwise, subroutine advances to determine whether the current image intersects the back layer but not the front layer (step 645). If the answer is YES, perform subroutine F (step 650); otherwise, subroutine 600 is over and return to the main flow 500.

The subroutine B 610 is taken when current image to be drawn (e.g., a new triangle) is closer than the front layer in step 605. This occurs when the CMAX value is less than the FMIN value (i.e., CMAX<FMIN). This is to test if the current triangle in the display block is closer to the viewpoint than the front layer. If the new image is indeed closer than the front layer (i.e., a YES response at step 605), the READ_Z_BUFFER Boolean is set to FALSE and the pixels in the block associated with the current triangle (hereinafter referred to as the new pixels) are rejected as not needing pixel-by-pixel z-buffer comparisons. Recall that not having to perform a pixel-by-pixel comparison provides substantial performance advantages. The new pixels can thus be displayed in the place of the old pixels without having to perform computationally intensive or memory intensive operations.

Figure 6B:
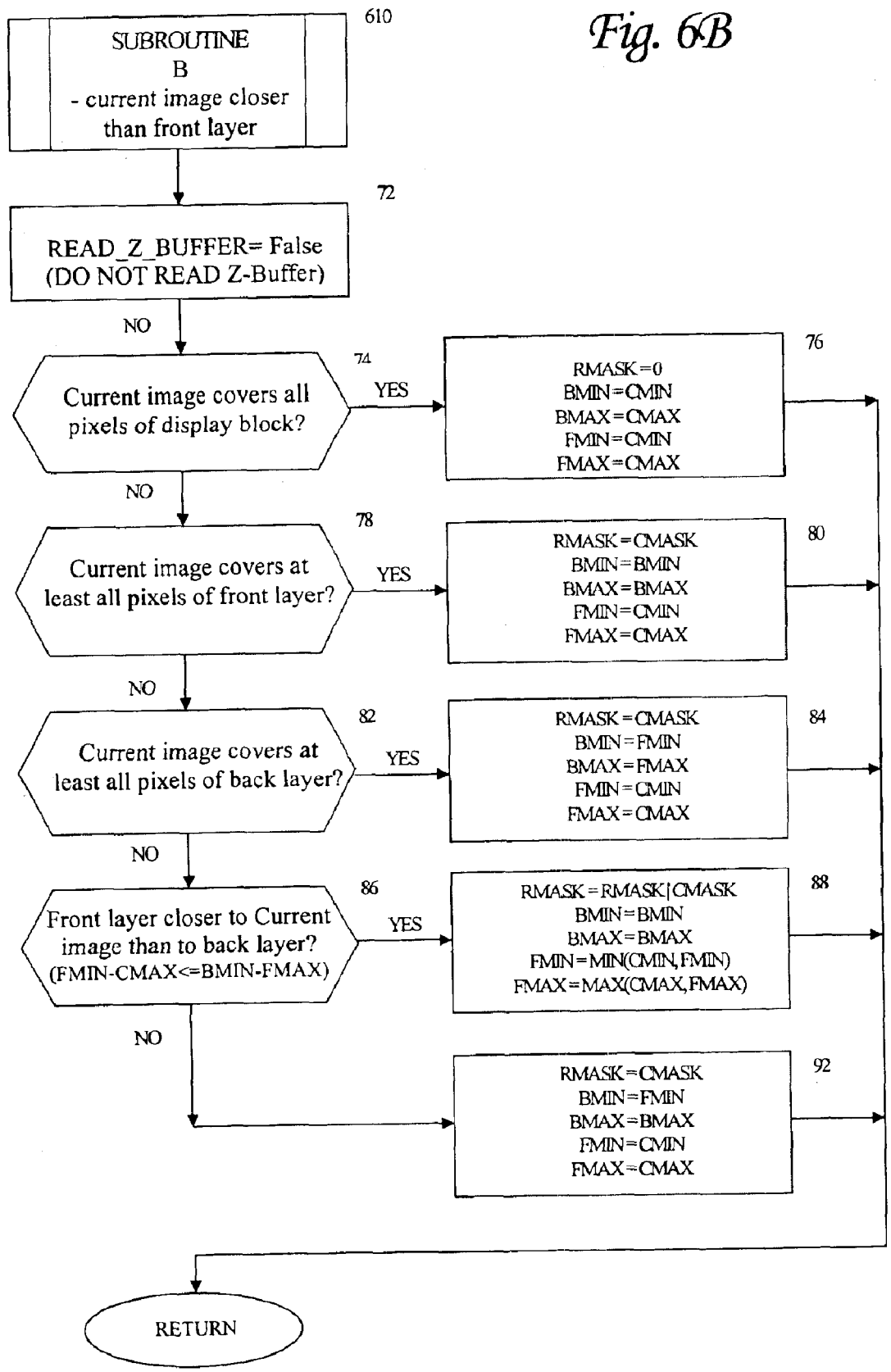
Figure 6C:
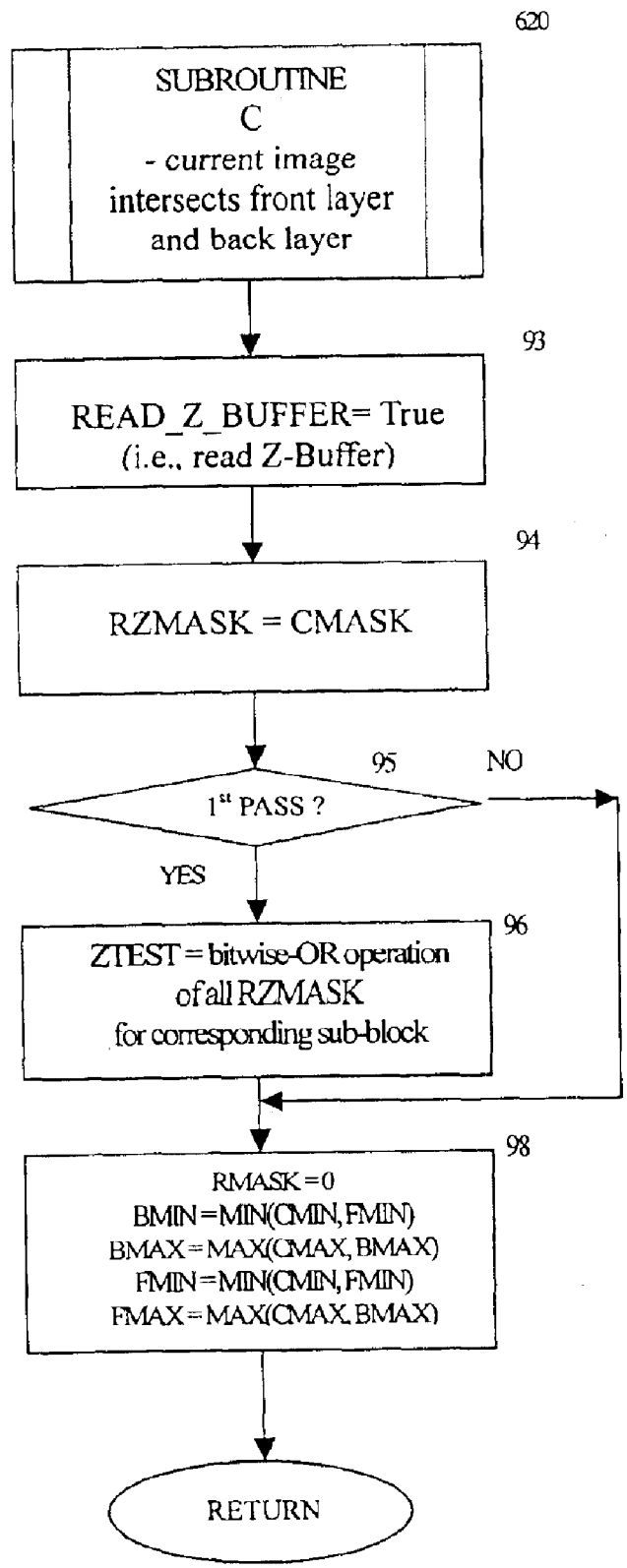
Figure 6D:
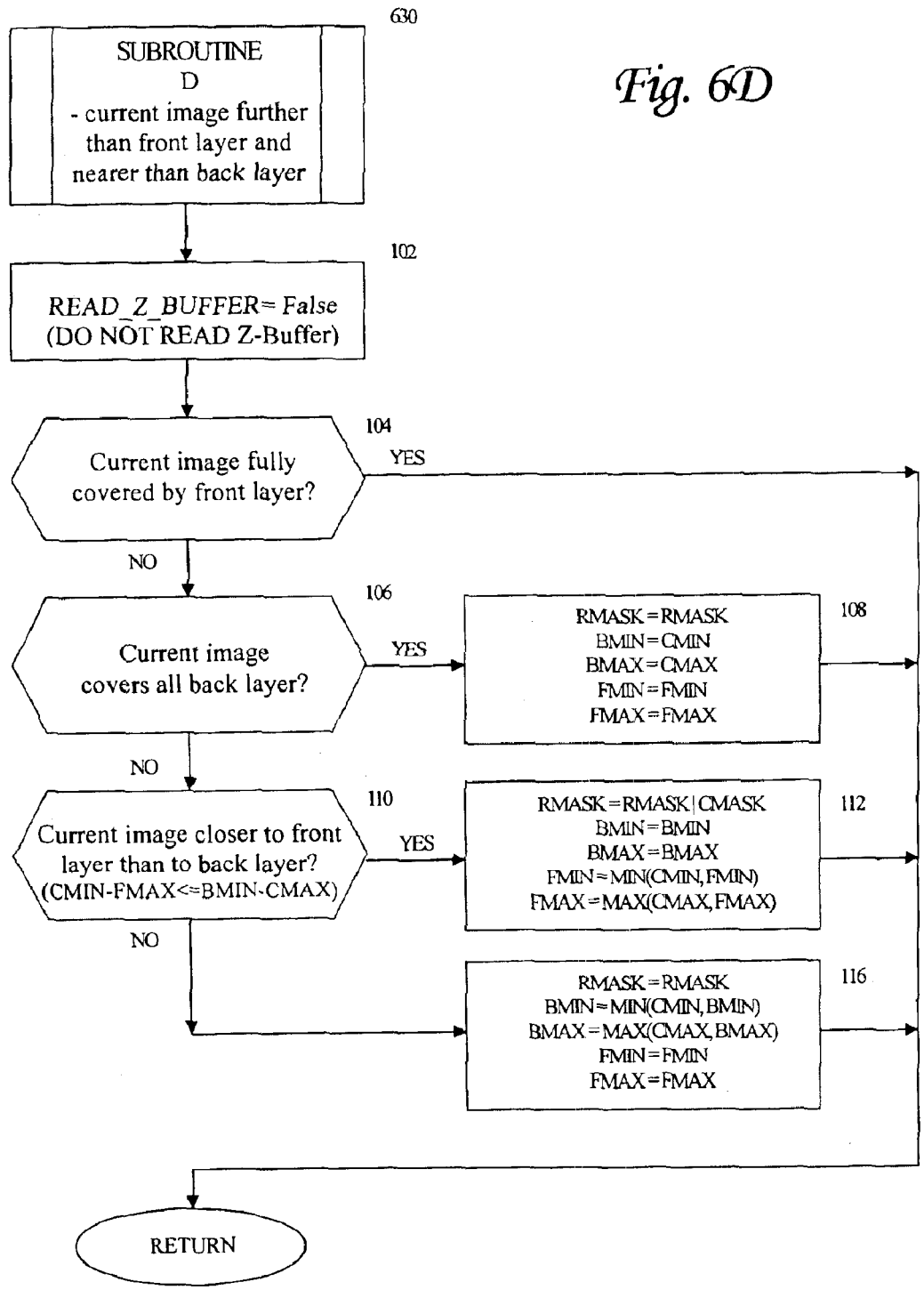
Figure 6E:
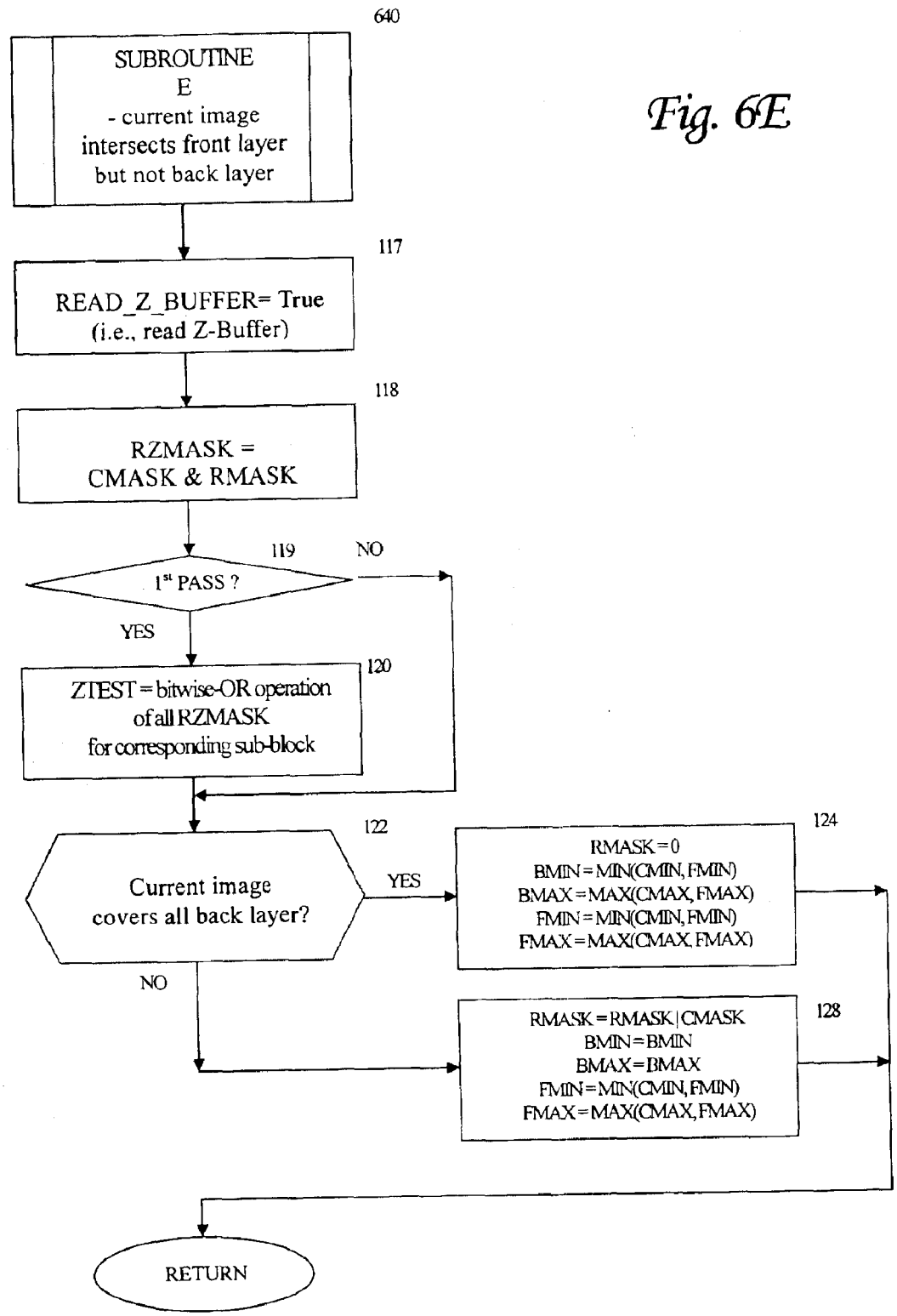
Figure 6F:
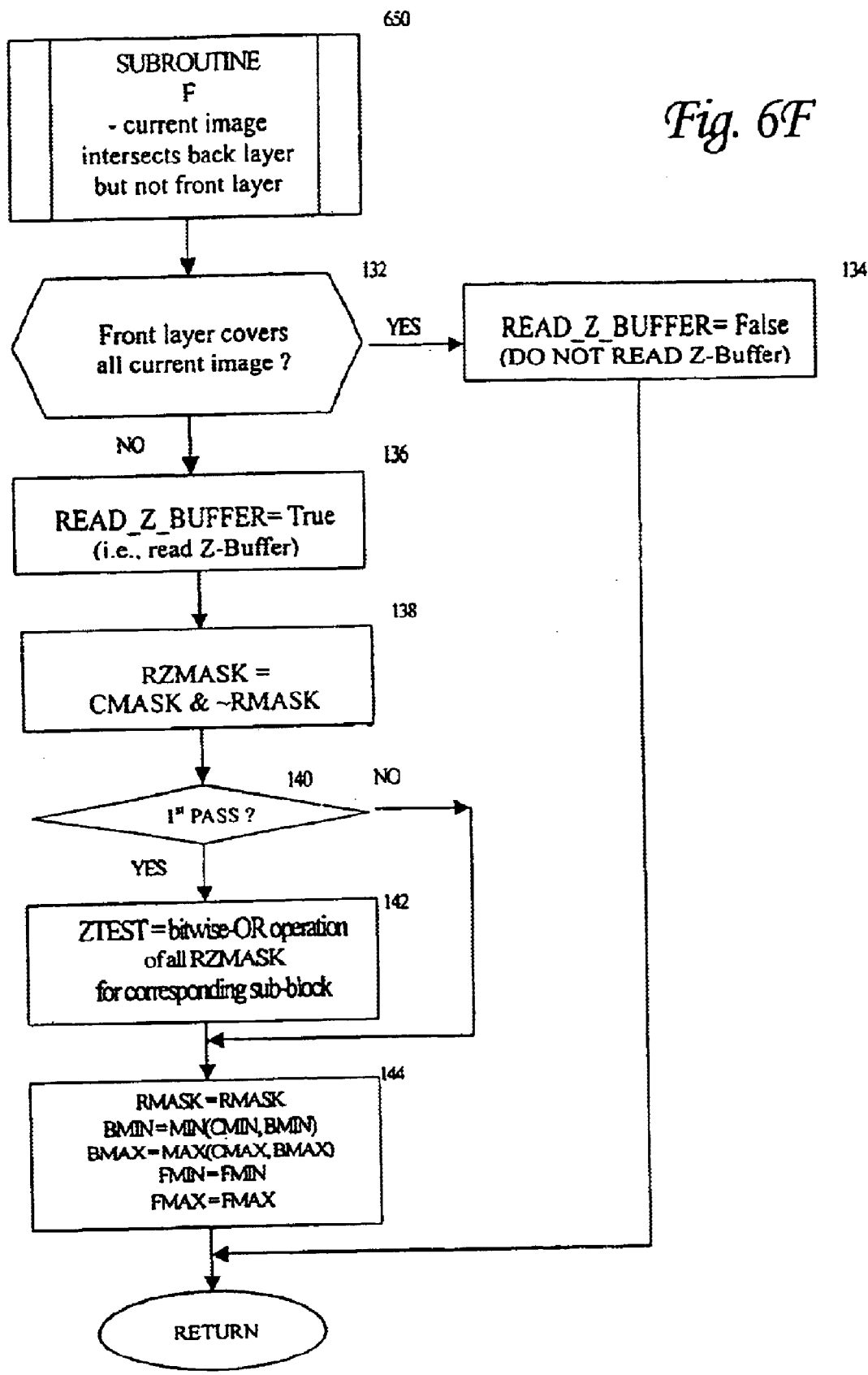
Figure 7A:
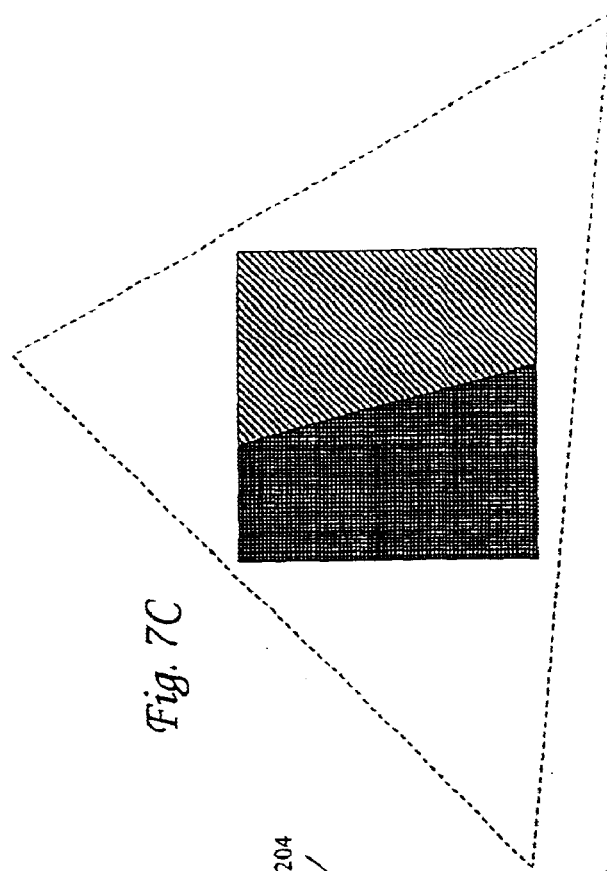
FIGS. 7A–7D are exemplary illustrations of a triangle closer to the viewpoint than a front layer and covering all the pixels of a block.
Figure 7B:
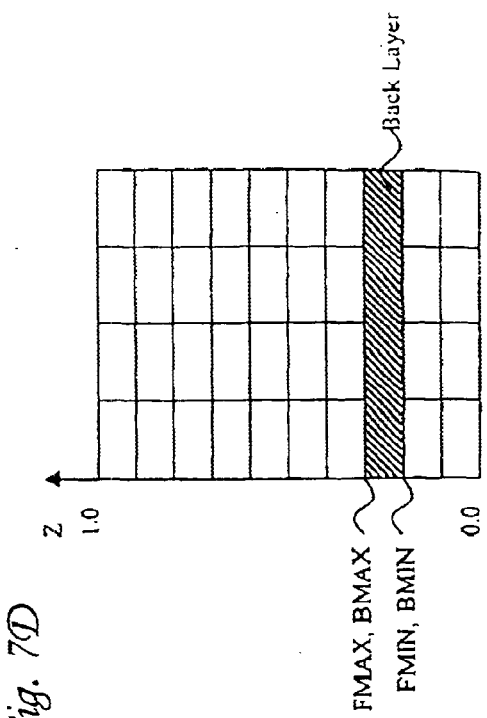
Figure 7C:
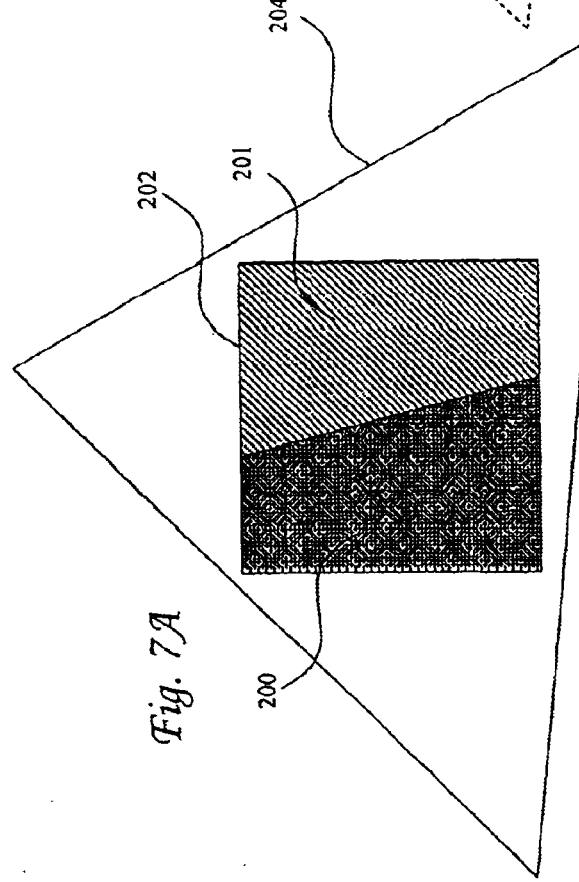
Figure 7D:
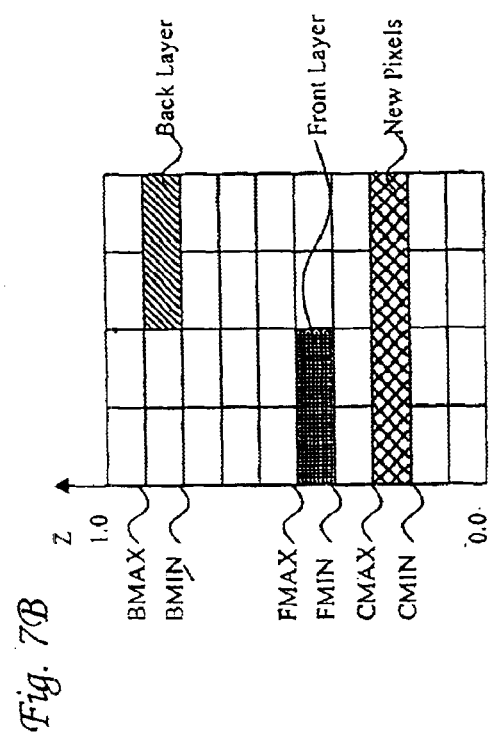

Subroutine B 610 of FIG. 6B next updates the range buffer through the operations of steps 74 through 92. At step 74, the subroutine B inquires whether the current image covers all the pixels of the display block (i.e., all the bits of the CMASK have been set to "1.") A YES response is illustrated in FIG. 7A wherein a currently displayed object 200 in display block 202 is hidden from view by the current triangle 204 that covers all of the display block 202. FIG. 7B is a sketched top view of FIG. 7A illustrating the z-ranges and the spans (occupied area) in x, y direction of the new pixels, front layer and the back layer with respect to FIG. 7A. In FIG. 7B, it can be seen that the front layer covers the left portion of the current block 202, the back layer covers the right portion of the current block 202, and both layers constitute the block 202. The front layer has a range between FMIN and FMAX, and the back layer has a range between BMIN and BMAX. The new pixels cover the whole block 202 and thus span front left to right. The new pixels are in a range between CMIN and CMAX, and this range does not intersect with the front layer, that is, CMAX<FMIN in the present situation. FIG. 7C illustrates the change of the RMASK, that is, the front and back layers in block 202 after considering the influence of the new pixels of the current triangle. As previously described, only one layer exists in this situation, namely, the layer made up by the new triangle 204 which is set as the back layer by assigning a value of "0" to the RMASK field in step 76. In addition, at step 76, the minimum z-values of the front and back layers, FMIN and BMIN, are set to the minimum z-value CMIN of the new triangle, and the maximum z-values of the front and back layers, BMAX and FMAX, are set to the maximum z-value CMAX of the new triangle in step 76. FIG. 7D is a sketched top view of FIG. 7C illustrating the z-ranges and the spans (occupied area) in x, y direction of the front layer and the back layer with respect to FIG. 7C. The subroutine B then returns to process 500 of FIG. 5.

If, however, the new triangle does not cover all the pixels of the display block, the subroutine B proceeds to step 78 in order to investigate whether the new triangle covers at least all the pixels belonging to the front layer. This scenario is illustrated in FIG. 8A and FIG. 8B which is a sketched top view of FIG. 8A where the front layer 206 and part of the back layer 208 are obscured by the current triangle 210. FIG. 8B is a sketched top view of FIG. 8A. In this instance, the new pixels become the new front layer by making RMASK=CMASK in step 80. Accordingly, FMIN is set to CMIN, and FMAX is set to CMAX 80. The back layer 208 minimum and maximum values remain the same. FIG. 8C illustrates the change of the RMASK after considering the influence of the new pixels of the current triangle and FIG. 8D is a sketched top view of FIG. 8C. The subroutine B then returns to process 500 of FIG. 5.

Figure 9C:
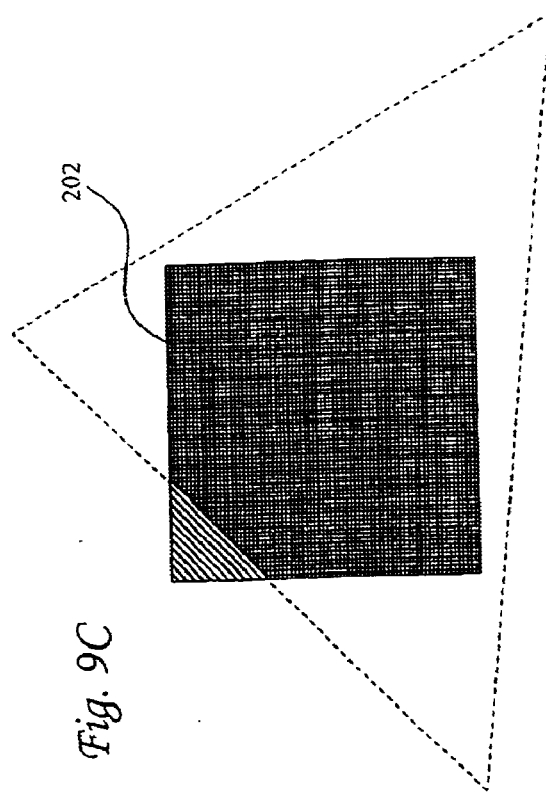
FIGS. 9A–9D are exemplary illustrations of a triangle closer to the viewpoint than a front layer and covering at least all the pixels of the back layer.
Figure 9D:
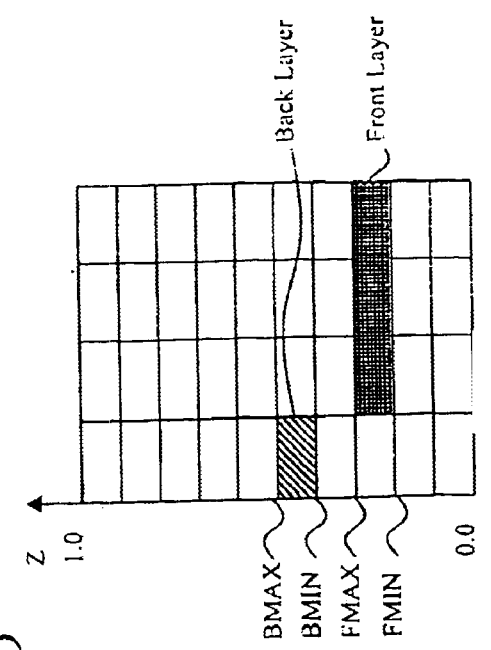
Figure 9A:
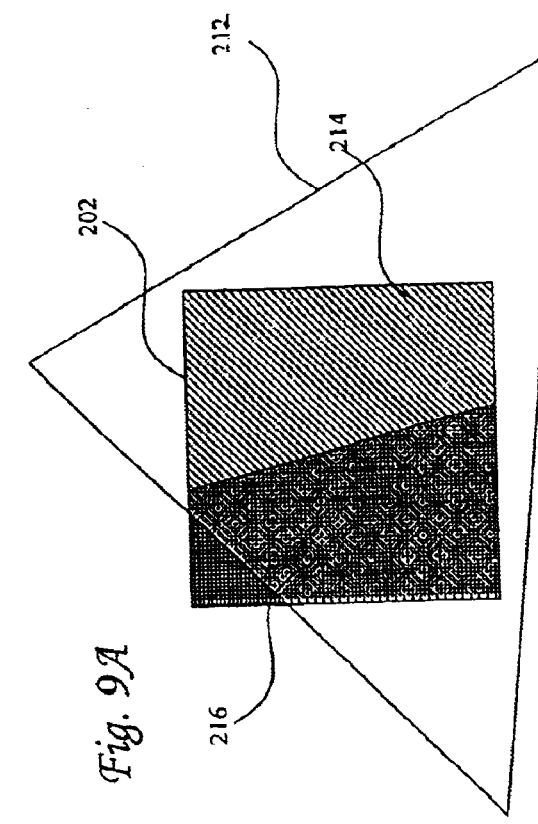
Figure 9B:
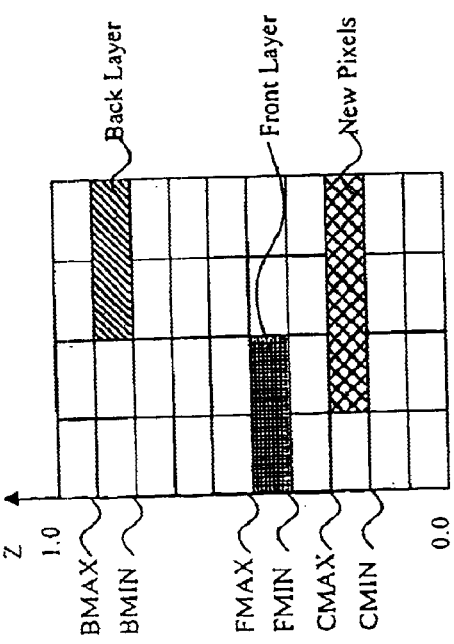

If the current new triangle does not cover at least the pixels belonging to the front layer, the subroutine B next examines whether the current new triangle covers at least all the pixels belonging to the back layer at step 82. This scenario is illustrated in FIG. 9A and FIG. 9B which is a sketched top view of FIG. 9A where the back layer is the previously exposed background of the display block 202. The current triangle 212 covers all of the back layer 214 and part of the front layer 216. In this situation, the range of old front layer 216 becomes that of the new back layer by making BMIN=FMIN and BMAX=FMAX at step 84. As in the previous case, the pixels in the display block 202 covered by the current triangle 212 then become the new front layer by making RMASK=CMASK. Moreover, the FMIN and FMAX values are also respectively set to the CMIN and CMAX values. FIG. 9C illustrates the change of the RMASK after considering the influence of the new pixels of the current triangle and FIG. 9D is a sketched top view of FIG. 9C. The subroutine B returns to process 500 of FIG. 5.

Figure 10C:
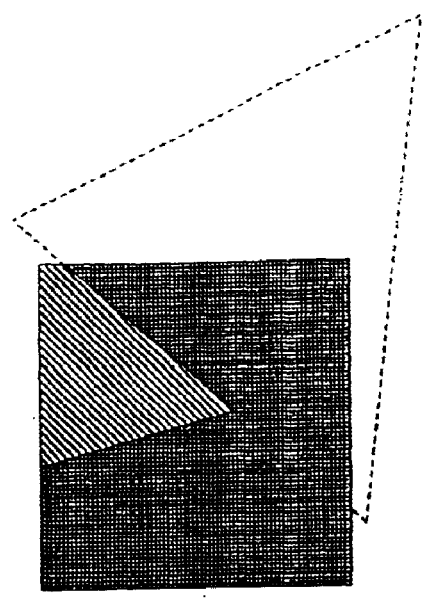
FIGS. 10A–10H are exemplary illustrations of a triangle closer to the viewpoint than a front layer and covering a portion of the pixels belonging to the front and back layers.
Figure 10D:
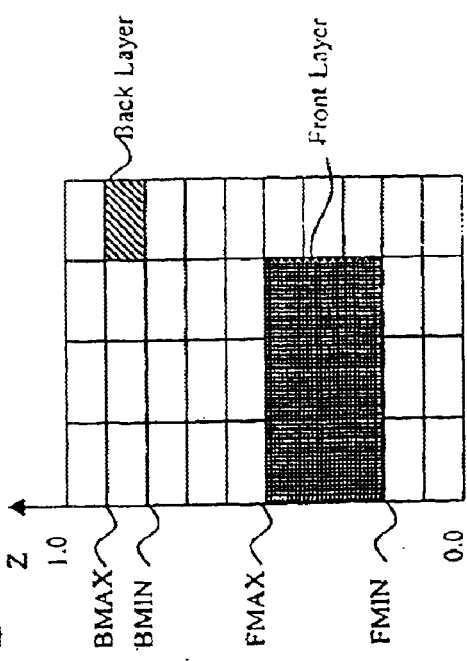
Figure 10A:
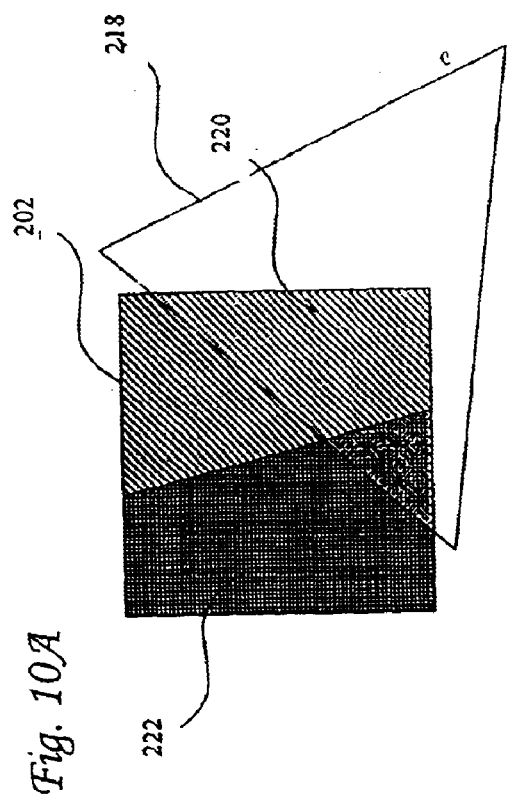
Figure 10B:
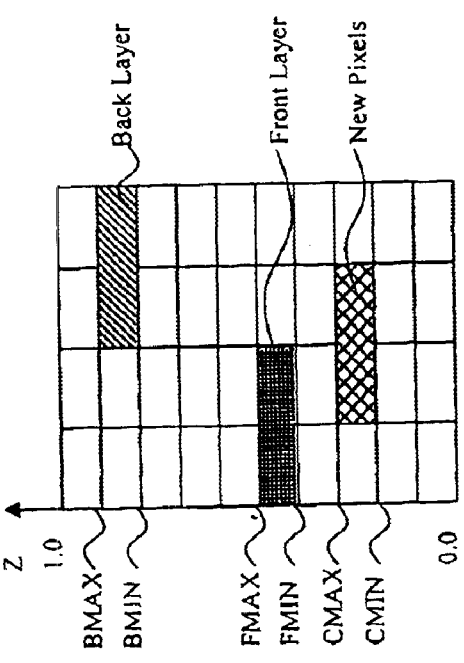

If neither the front nor back layers are completely covered by the new triangle, the subroutine B next inquires at step 86 whether the new triangle covers a portion of the front layer and a portion of the back layer, and whether the distance between FMIN and CMAX is less or equal to the distance between BMIN and FMAX, namely, FMIN−CMAX<=BMIN−FMAX. With reference to FIG. 10, note that the distance check is used to associate a old front layer 222 with the closer of either the current triangle 218 which will be at least part of the front layer 222 or whether to associate the old front layer 222 with the back layer 220 of display block 202. Step 86 checks whether the old front triangle 222 will be associated with the front layer that includes new triangle 218. Basically, the new range of the front layer becomes the composite of those of the old front layer 222 and the current triangle 218. Similarly, the span of the new front layer becomes the composite of those of the old front layer 222 and the current triangle 218. This is accomplished at step 88 by further including in a new RMASK value any new pixels from CMASK that are not already included in an old RMASK value (i.e., RMASK|=CMASK). Moreover, the new FMIN value becomes the minimum of the CMIN and FMIN values, and the new FMAX value becomes the maximum of the CMAX and FMAX values. The BMIN and BMAX values remain intact 88. FIG. 10C illustrates the change of the RMASK after considering the influence of the new pixels of the current triangle and FIG. 10D is a sketched top view of FIG. 10C. The subroutine B returns to process 500 of FIG. 5.

Figure 10G:
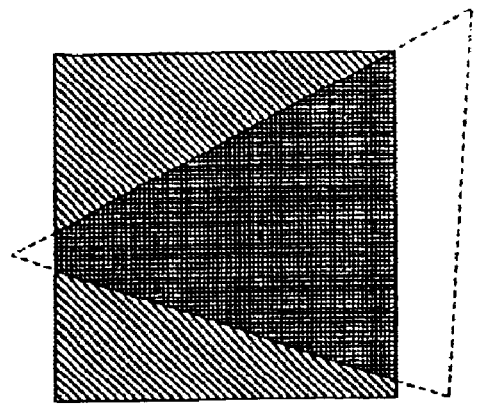
Figure 10H:
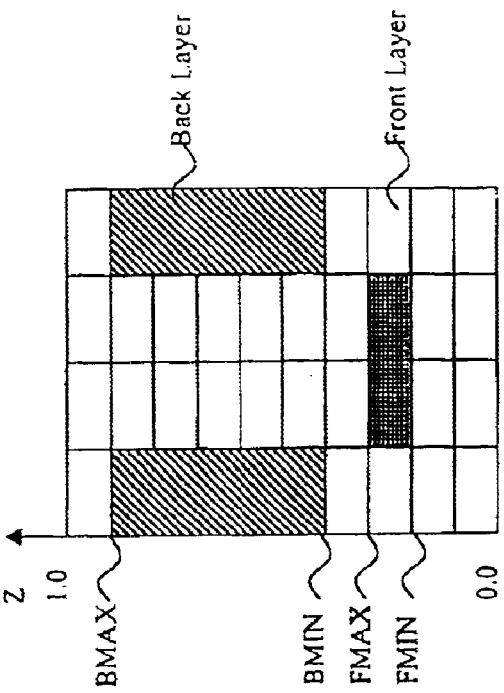
Figure 10E:
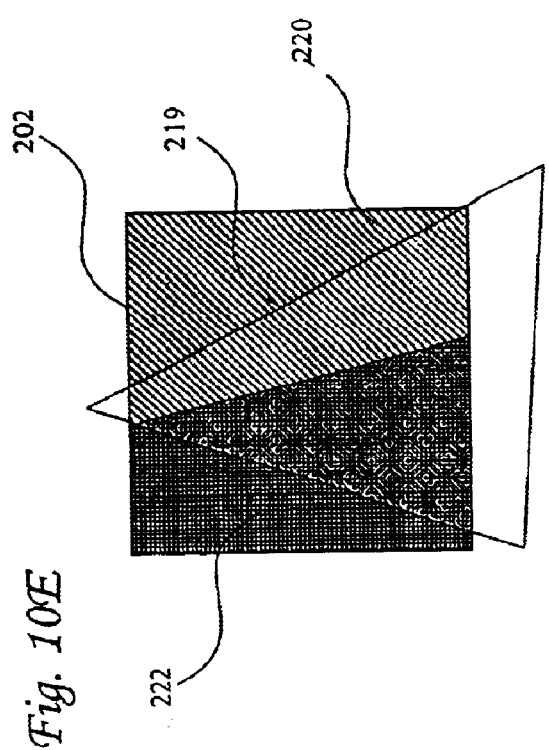
Figure 10F:
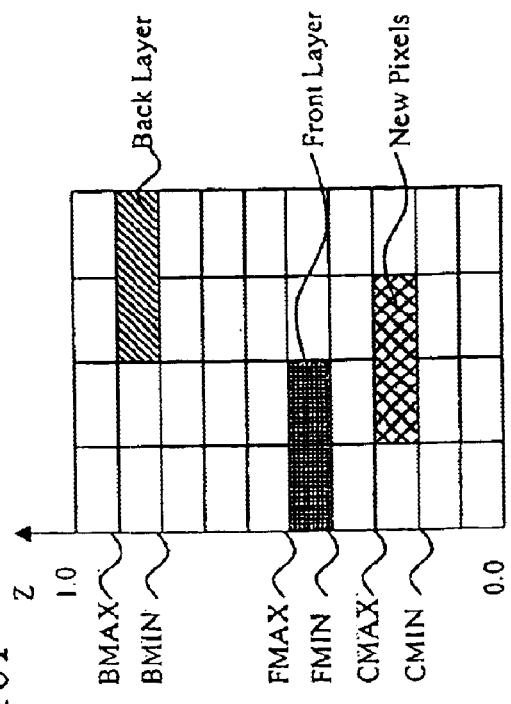

However, if the distance between FMIN and CMAX is greater than the distance between BMIN and FMAX as inquired in decision diamond 86, namely, FMIN−CMAX>BMIN−FMAX, the pixels associated with the front layer 222 (FIGS. 10E & 10F) which are not covered by the current triangle 219 become associated with the back layer 220. Accordingly, at step 92 RMASK is set equal to CMASK. The new pixels then become the new front layer. The minimum and maximum z-values of both layers are also updated by setting BMIN=FMIN, BMAX=BMAX (i.e., unchanged), FMIN=CMIN, and FMAX=CMAX 92. FIG. 10G illustrates the change of the RMASK after considering the influence of the new pixels of the current triangle and FIG. 10H is a sketched top view of FIG. 10G. The subroutine B returns to process 500 of FIG. 5.

Figure 11C:
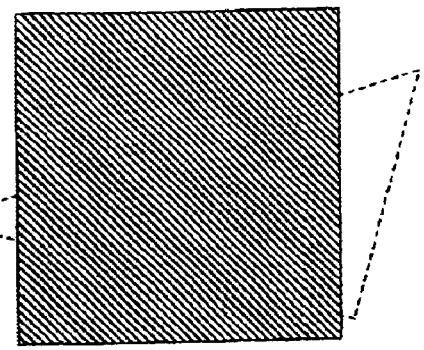
FIGS. 11A–11D are exemplary illustrations of pixels in a triangle whose z-values intersect with the z-ranges of the front and back layers.
Figure 11D:
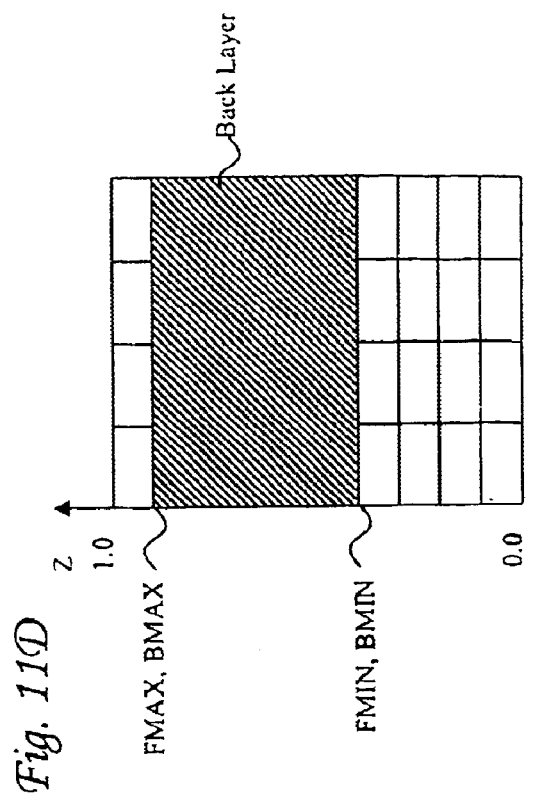
Figure 11A:
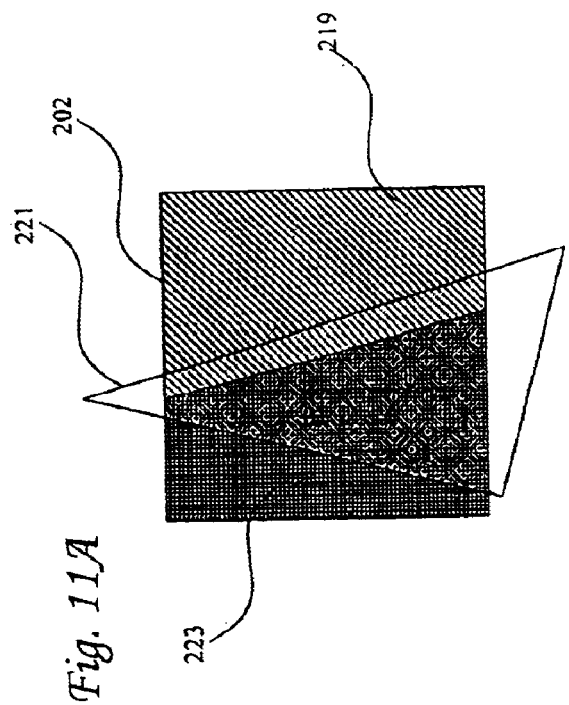
Figure 11B:
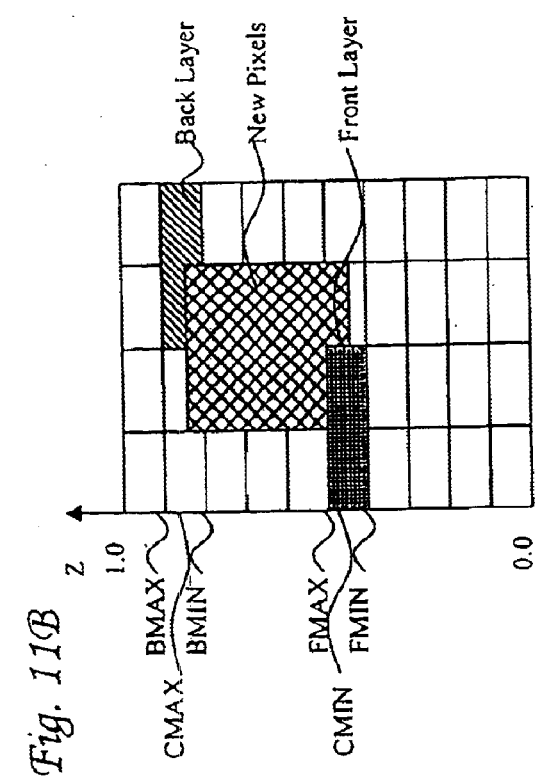

Referring back to step 605 of FIG. 6A, if the new triangle in the display block is not closer to the viewpoint than the front layer, the subroutine proceeds to step 615 to inquire whether the new image intersects the front and back layers by checking whether CMIN is less than FMAX, and whether CMAX is greater than BMIN (i.e., CMIN<FMAX). If the answer is YES, the Z-RANGE BUFFER subroutine 600 advances to subroutine C 620, in which the z-ranges of the current triangle 221 intersect with the z-ranges of the front layer 223 and back layer 219 as illustrated in FIGS. 11A and 11B. Thus, with reference to FIG. 6C, a z-buffer read must be done to perform a pixel-by-pixel comparison and to determine which pixels are hidden from view and which pixels are not. Accordingly, the READ_Z_BUFFER Boolean is set to TRUE at step 93. A read z-buffer mask, RZMASK, of the same size as that of CMASK is provided as a bitmask to record a bit for each pixel of the current block 202 to determine if z-buffer read is necessary for that pixel to perform pixel-by-pixel z-comparison. The bits of RZMASK are set to "1" if the new pixels of the current triangle intersect in range with either the front layer or the back layer. In the present situation, the new pixels of the current triangle intersect in range with both the front layer and the back layer and therefore, RZMASK=CMASK. An example is shown in FIGS. 17A–17C. The subroutine C then advances to decision diamond 95 to check which phase it is now. If it is in the first pass phase, we have to determine the ZTEST values for all the sub-blocks in the display blocks 202 in step 96 so that the ZTEST values can be used in the second pass phase. The ZTEST value of a specific sub-block can be acquired by performing bit-wise logic OR operation of all RZMASK bits corresponding to that sub-block. Since RZMASK records all bits that require performing Z-BUFFER subroutine, ZTEST field records all the sub-blocks involved in performing Z-BUFFER subroutine. For the example shown in FIGS. 17A–17C, the display block includes four sub-blocks, SUB-BLOCK 0, SUB-BLOCK 1, SUB-BLOCK 2, and SUB-BLOCK 3, and the ZTEST is [1110]. The result can be interpreted as: if the sub-block contains a pixel which requires performing z-buffer subroutine, the corresponding ZTEST field is set to "1"; otherwise, the corresponding ZTEST field is set to "0" and no z-buffer subroutine is required. Otherwise, an answer of NO at step 95 indicates that the first pass has been completed and the ZTEST field has been set. The subroutine C proceeds to update the range buffer at step 98. The new pixels along with the pixels associated with the front layer become the new back layer by making RMASK="0" for all pixels. The new BMIN and FMIN values are set to the smaller of the CMIN and old FMIN values in step 98. The new BMAX and FMAX values are set to the bigger of the CMAX and old BMAX values in step 98. FIG. 11C illustrates the change of the RMASK after considering the influence of the new pixels of the current triangle and FIG. 11D is a sketched top view of FIG. 11C. The subroutine C then returns to the process 500 of FIG. 5.

Figure 12A:
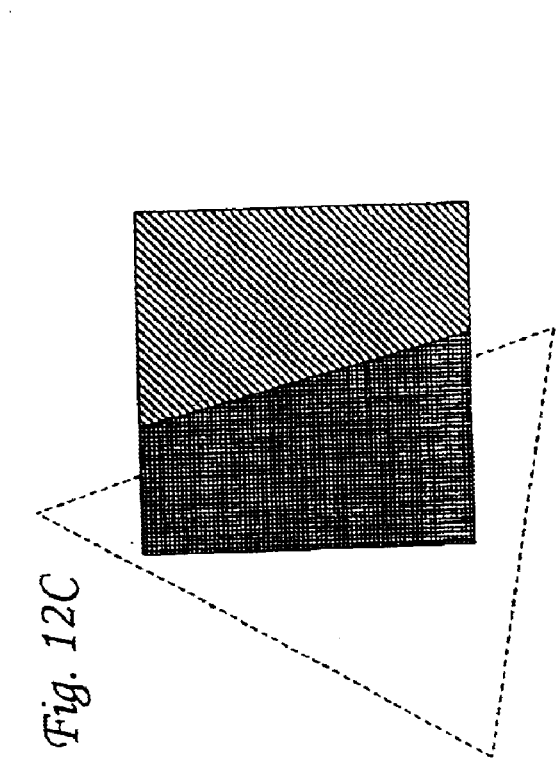
FIGS. 12A–12D are exemplary illustrations of a triangle further from the viewpoint than a front layer but closer to the viewpoint than a back layer, whose pixels are entirely covered by the front layer.
Figure 12B:
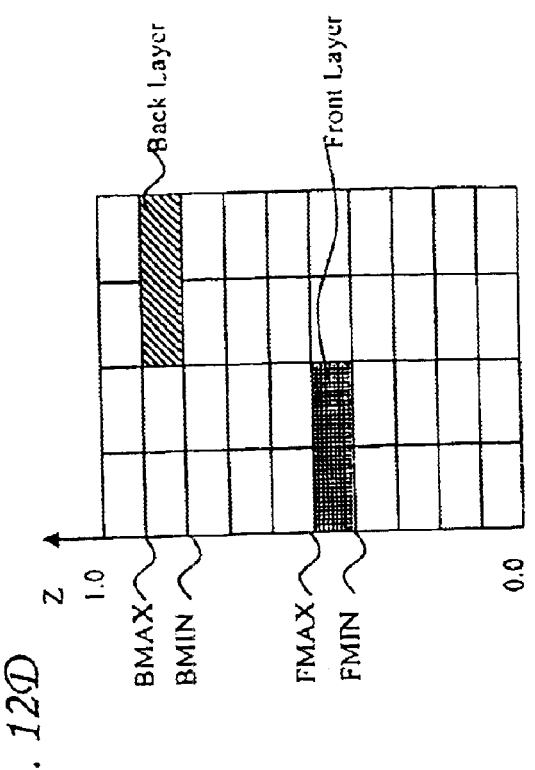
Figure 12C:
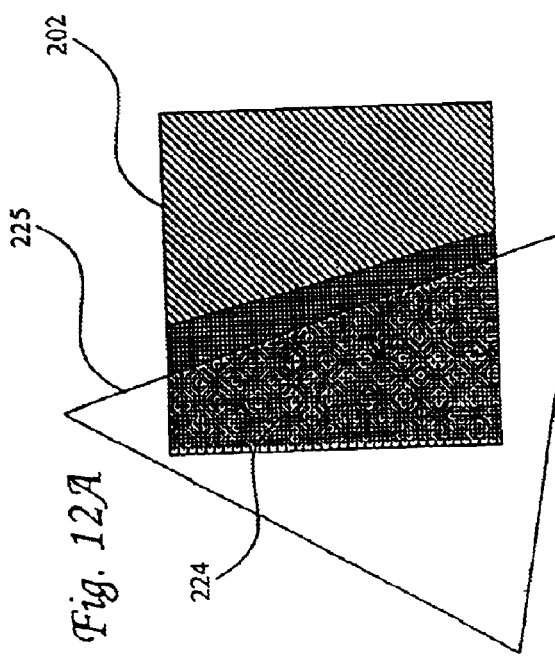
Figure 12D:
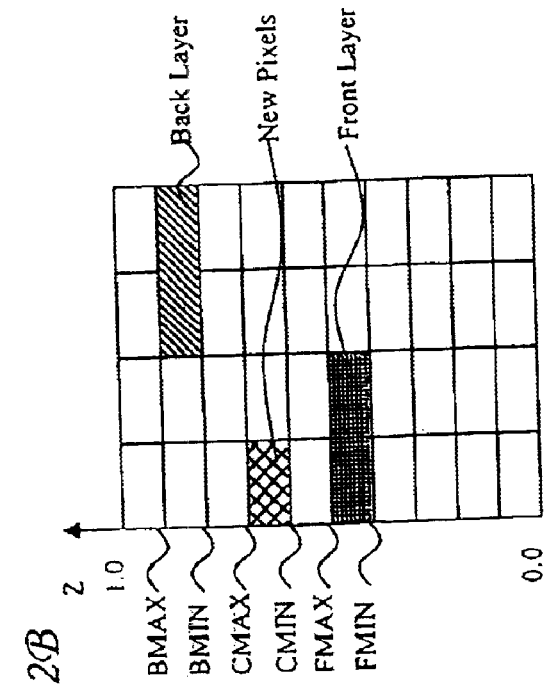

Referring back to step 615, FIG. 6A, if the new image does not intersect the front and back layers (i.e., NO branch from step 615), the subroutine next inquires whether the new image is further than the front layer, but closer than the back layer with no intersection, that is if CMIN>=FMAX and CMAX<=BMIN, in step 625. This condition confirms that the current image lies strictly between the front and back layers and the subroutine advance to subroutine D 630. Please refer to FIG. 6D. Because the z-ranges do not intersect, the subroutine D proceeds to set the READ_Z_BUFFER Boolean to FALSE at step 102. Next, the subroutine D updates the range buffer by first inquiring at step 104 whether the new pixels are all covered by the front layer as depicted in FIGS. 12A and 12B. The current triangle 225 is completely covered from view by the front layer 224 and thus, will not be displayed by the main process of FIG. 5. FIG. 12C illustrates the change of the RMASK after considering the influence of the new pixels of the current triangle and FIG. 12D is a sketched top view of FIG. 12C. In this case, no updates to the range buffer are necessary and the subroutine D simply returns to process 500 of FIG. 5.

Figure 13A:
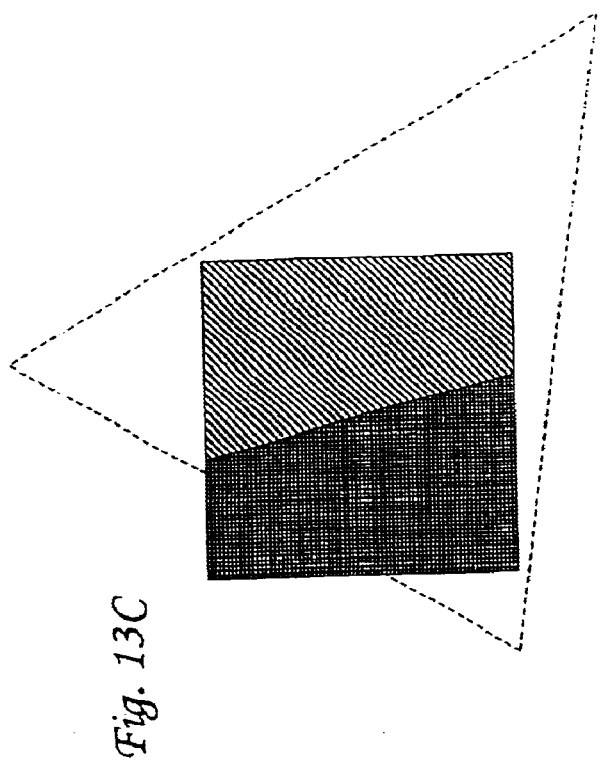
FIGS. 13A–13D are exemplary illustrations of a triangle further from the viewpoint than a front layer but closer to the viewpoint than a back layer, whose pixels entirely cover the back layer.
Figure 13B:
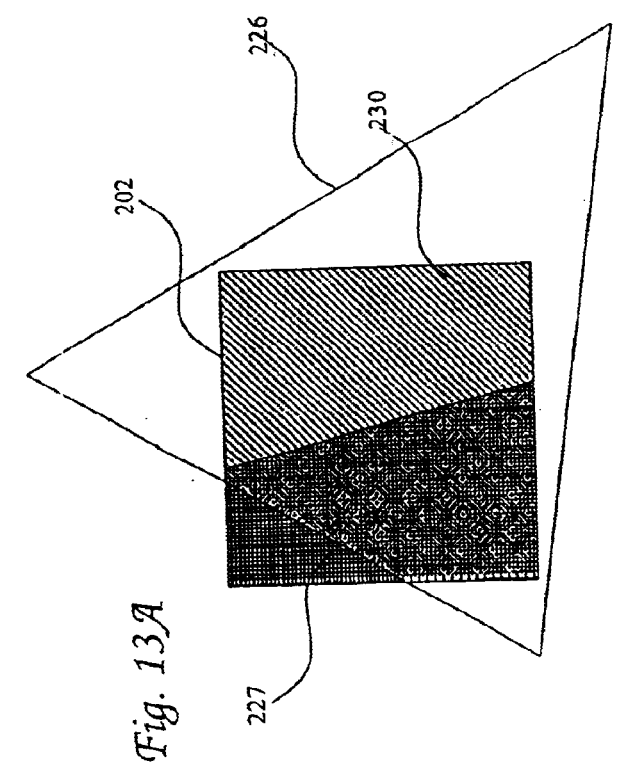
Figure 13C:
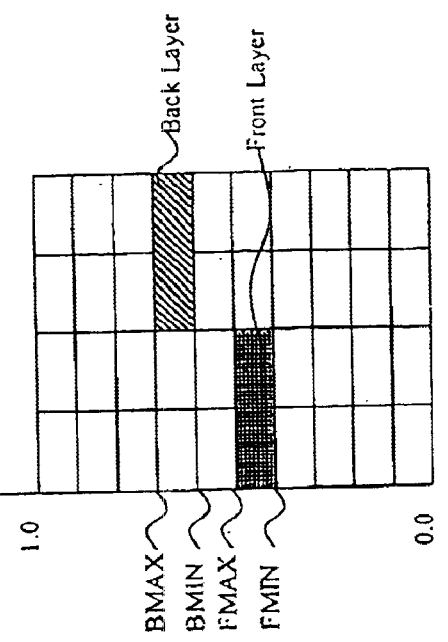
Figure 13D:
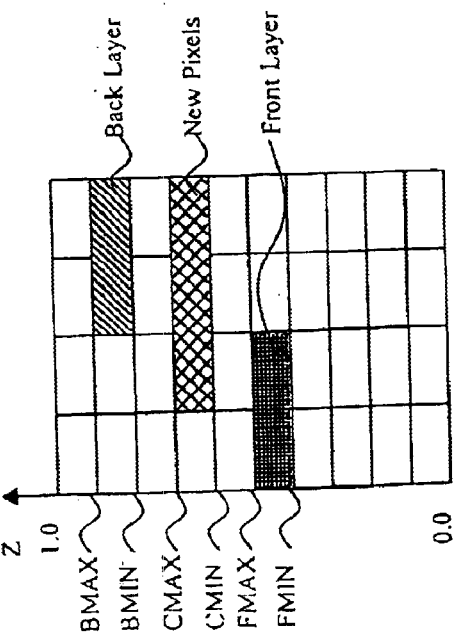

Otherwise, if the new pixels are not all covered by the front layer, the subroutine D next inquires at step 106 whether the new triangle covers all the pixels in the back layer. As shown with reference to FIG. 13, the new pixels of the current triangle 226 which are not covered by the front layer 227 are visible; thus, those pixels can all be displayed and make up the background back layer. Moreover, new triangle 226 covers all of the back layer 230 and the uncovered pixels of the display block 202, that is, the uncovered old front layer makes up the new front layer. Thus, the RMASK value and front layer minimum and maximum values remain the same at step 108. However, the BMIN and BMAX values are set to CMIN and CMAX, respectively, because the new pixels are now associated with the new back layer 108. FIG. 13C illustrates the change of the RMASK after considering the influence of the new pixels of the current triangle and FIG. 13D is a sketched top view of FIG. 13C. The subroutine D then returns to the process 500 of FIG. 5.

Figure 14C:
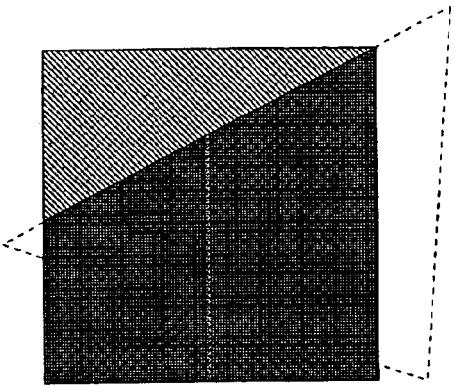
FIGS. 14A–14H are exemplary illustrations of a triangle further from the viewpoint than a front layer but closer to the viewpoint than a back layer, that does not fully cover all of the back layer and is not fully covered by the front layer.
Figure 14D:
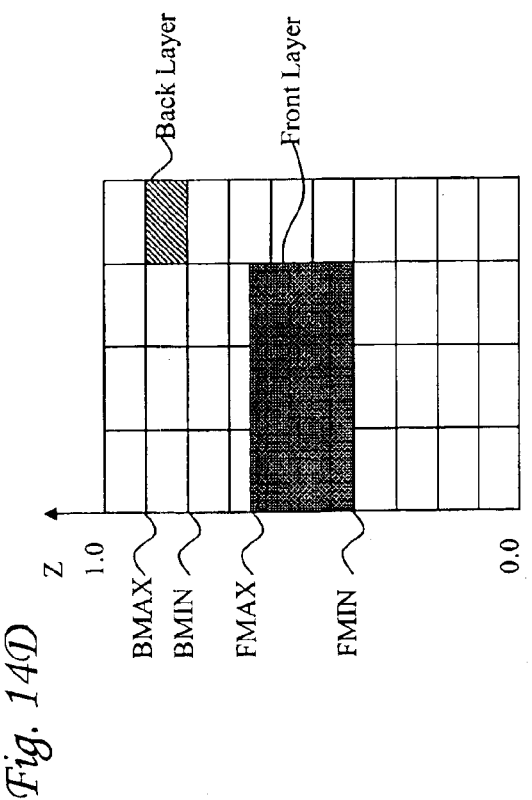
Figure 14A:
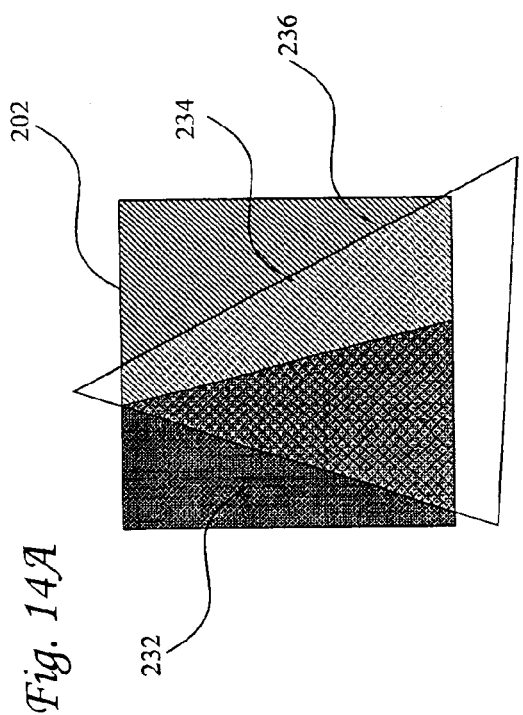
Figure 14B:
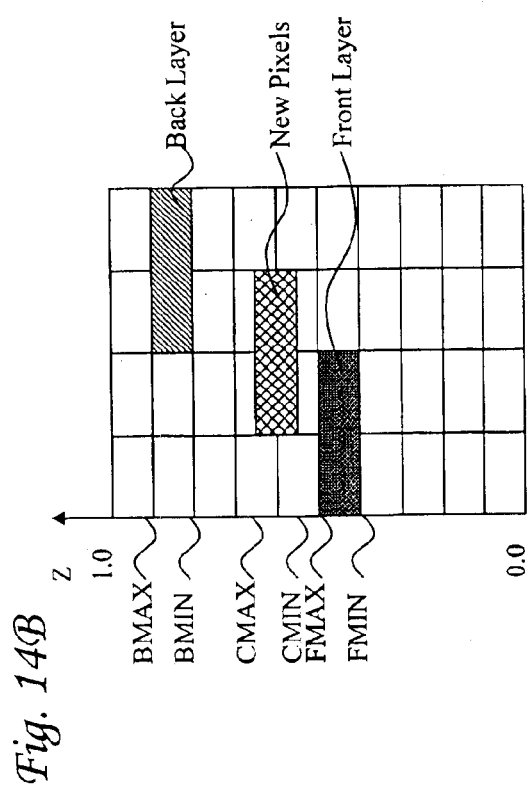

The process proceeds to step 110 with a negative response at step 106. At step 110, the process inquires whether the new image that is neither fully covered by the front layer nor cover all of the back layer is closer to the front layer (i.e., the difference between the CMIN and FMAX values is less than or equal to the difference between the BMIN and CMAX values, or more precisely, CMIN−FMAX<=BMIN−CMAX). With a YES response is illustrated in FIG. 14A and 14B. Because the front layer 232 at most covers only a portion of the new pixels making up the current triangle 234, the uncovered pixels are visible and thus, displayed. In this example, the current triangle 234 is not covered by the front layer 232, and does not cover the back layer 236. Thus, if the answer to the inquiry at step 110 is YES, the subroutine D proceeds to set the pixels covered by the current triangle 234 as part of the front layer 232 because the new triangle is closer to the front layer. In other words, the new pixels and the front layer merge into the new front layer in both the range and the span. This is done by making the new RMASK the composite of the old RMASK and CMASK (i.e., RMASK|=CMASK, or RMASK|=RMASK|CMASK) at step 112. Moreover, the new FMIN value becomes the minimum of the CMIN and FMIN values, and the new FMAX value becomes the maximum of the CMAX and FMAX values 112. The BMIN and BMAX values remain unchanged. FIG. 14C illustrates the change of the RMASK after considering the influence of the new pixels of the current triangle and FIG. 14D is a sketched top view of FIG. 14C. The subroutine D returns then returns to process 500 of FIG. 5.

Figure 14G:
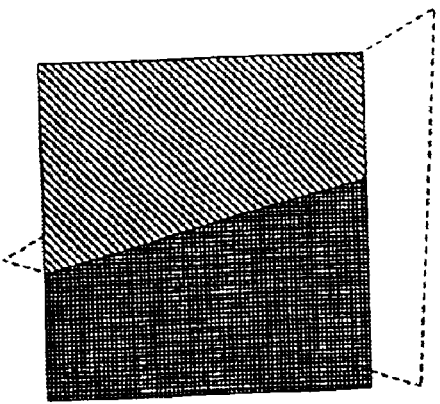
Figure 14H:
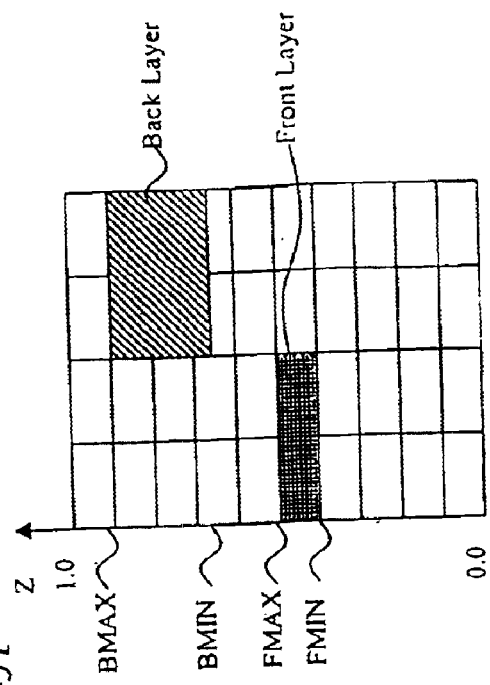
Figure 14E:
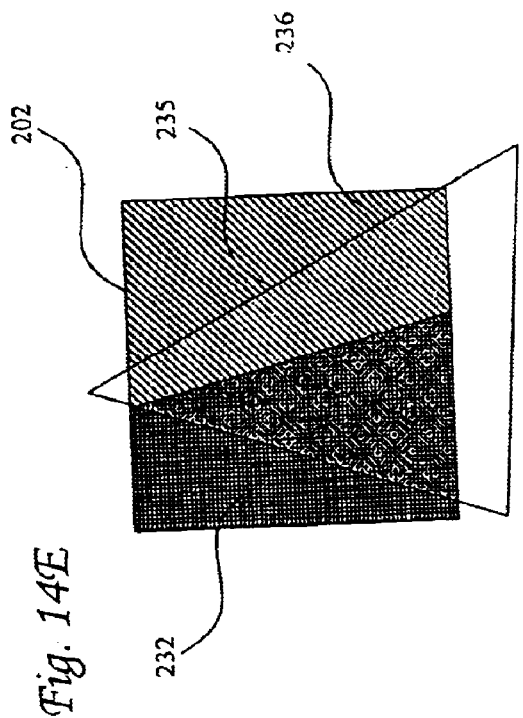
Figure 14F:
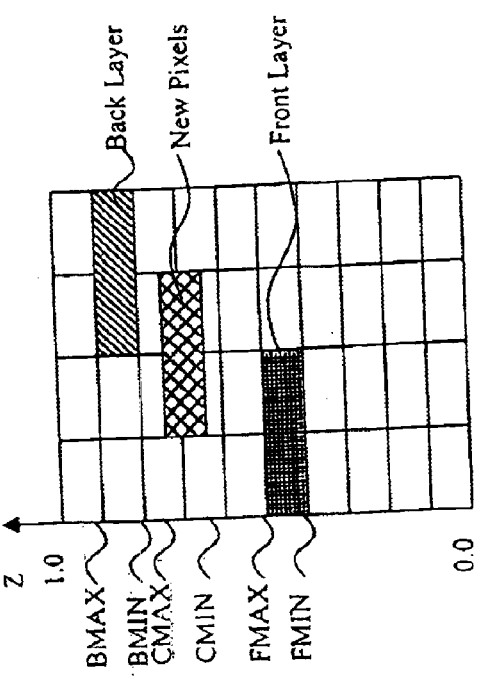

If the answer to the step 110 is NO, namely, the new triangle is closer the to the back layer as shown in FIGS. 14E and 14F (i.e., the distance between FMIN and CMAX is greater than the distance between BMIN and FMAX, or more precisely, CMIN−FMAX>BMIN−CMAX) the front layer is unchanged and the RMASK value remains the same at step 116. Thus, the new pixels are associated with the back layer. The minimum and maximum values of the front layer also remain the same. But the new BMIN value is set to the minimum of the old BMIN and CMIN values, and the new BMAX value is set to the maximum of the old BMAX and CMAX values. FIG. 14G illustrates the change of the RMASK after considering the influence of the new pixels of the current triangle and FIG. 14H is a sketched top view of FIG. 14G. The subroutine D then returns to the process 500 of FIG. 5.

Referring back to decision diamond 625 of subroutine 600 shown in FIG. 6A, a NO response proceeds to decision diamond 635 in which the subroutine inquires whether the current new image intersects the front layer, but not the back layer (i.e., CMIN<FMAX and CMAX<=BMIN 635). If the answer is YES, the process proceeds to subroutine E 640, where the z-ranges of the new pixels intersect with the z-ranges of the front layer but not the back layer. Thus, please refer to FIG. 6E, the READ_Z_BUFFER Boolean is set to TRUE at step 117 thus requiring reading of the z-buffer.

Figure 15C:
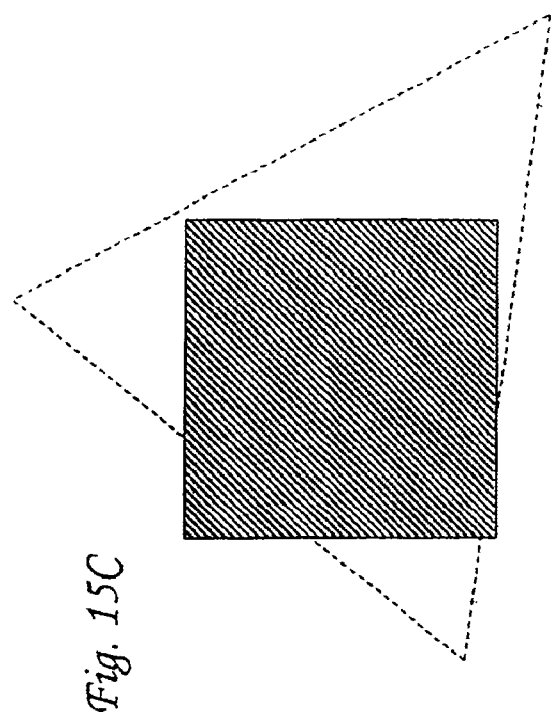
FIGS. 15A–15H are exemplary illustrations of pixels of a triangle whose z-ranges intersect with the z-ranges of the front layer but not the back layer, and whose pixels cover all of the back layer.
Figure 15A:
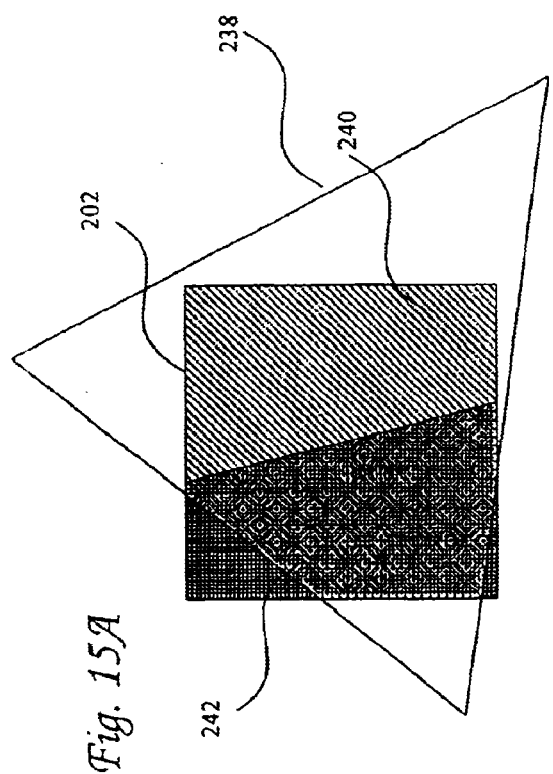
Figure 15D:
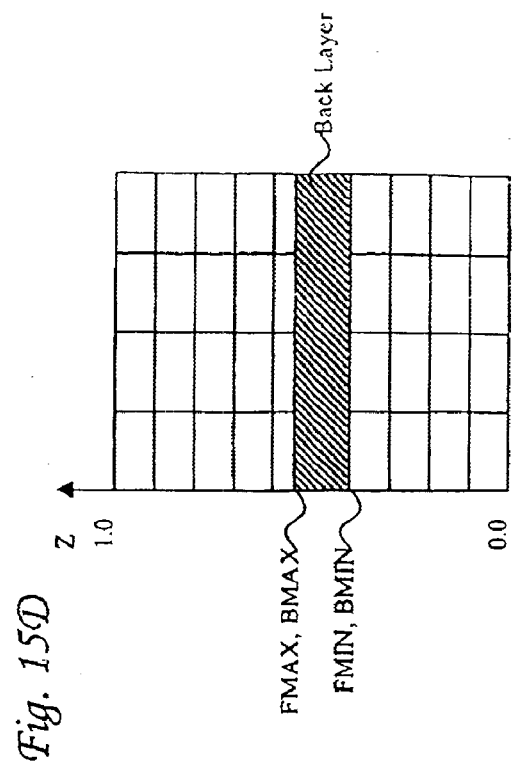
Figure 15B:
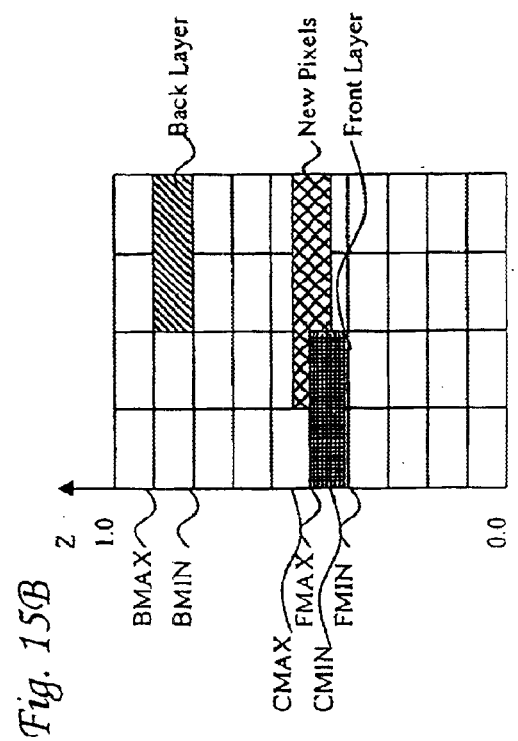

The subroutine E then proceeds to step 118 to set the value of the RZMASK to determine which pixels require performing pixel-by-pixel z-buffer-comparison. In the present situation, the current triangle intersects the front layer, and therefore, the intersected pixels can be determined and set by bit-wise logic AND operation on CMASK and RMASK, and thus RZMASK=CMASK & RMASK. An example is shown in FIGS. 18A–18C. The subroutine E then advances to decision diamond 119 to check which phase it is now. If it is in the first pass phase, we have to determine the ZTEST values for all the sub-blocks in the display blocks 202 in step 120 so that the ZTEST values can be used in the second pass phase. The ZTEST value of a specific sub-block can be acquired by performing bit-wise logic OR operation of all RZMASK bits corresponding to that sub-block. For the example shown in FIGS. 18A–18C, the display block includes four sub-blocks, SUB-BLOCK 0, SUB-BLOCK 1, SUB-BLOCK 2, and SUB-BLOCK 3, and the ZTEST is [0111]. The result can be interpreted as: if the sub-block contains a pixel which requires performing z-buffer subroutine, the corresponding ZTEST field is set to "1"; otherwise, the corresponding ZTEST field is set to "0" and no z-buffer subroutine is required. Otherwise, an answer of NO at step 119 that the first pass has been completed and the ZTEST field has been set. The process then advances to update the range buffer by inquiring at step 122 whether the current triangle 238 of FIGS. 15A and 15B covers all the pixels in the back layer. The back layer 240 in this particular example is the background portion of the display block 202 not covered by the front layer 242. If the answer is YES, every bit of the RMASK value is set to "0" at step 124. Thus, the new pixels making up the triangle 238 and the pixels in the front layer 242 are merged into a single layer in both range and span which becomes the block's new back layer. The new BMIN and FMIN values are both set to the smaller of the CMIN and old FMIN values at step 124. The new BMAX and FMAX values are both set to the bigger of the CMAX and old FMAX values at step 124. FIG. 15C illustrates the change of the RMASK after considering the influence of the new pixels of the current triangle and FIG. 15D is a sketched top view of FIG. 15C. The subroutine E then returns to process 500 of FIG. 5.

Figure 15E:
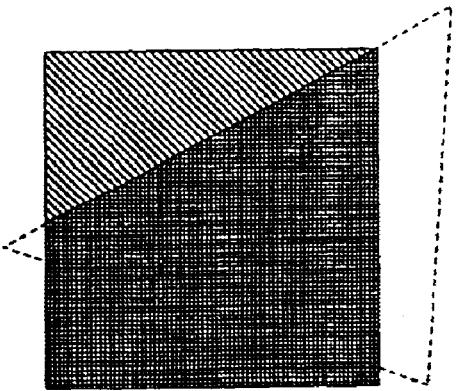
Figure 15F:
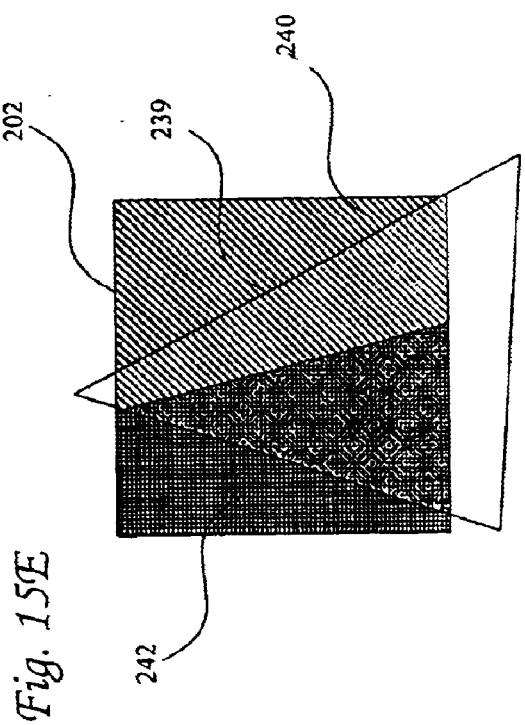
Figure 15G:
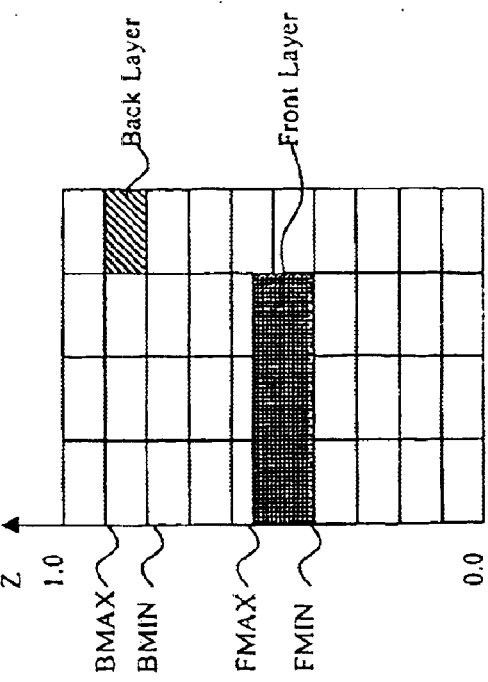
Figure 15H:
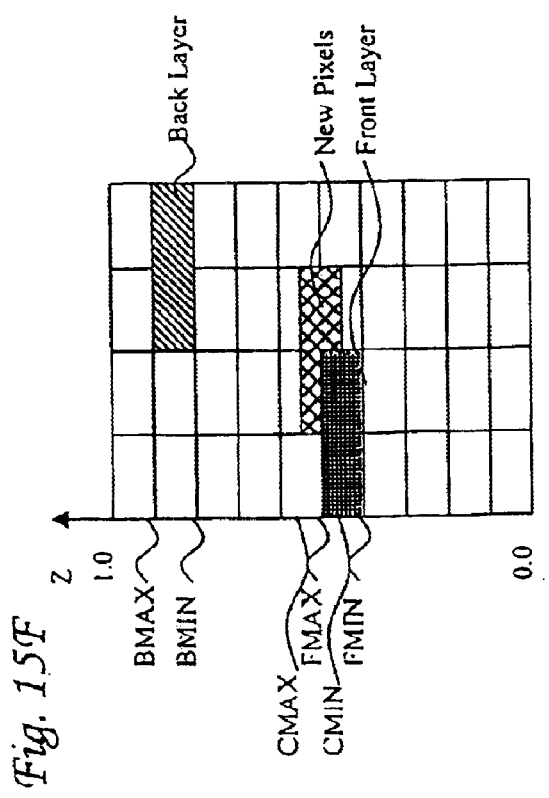

If, however, the answer to the step 122 is NO, namely, the new triangle does not cover all the pixels in the back layer as shown in FIGS. 15E and 15F, the new pixels are added as part of the front layer (i.e., RMASK|=CMASK, or RMASK= RMASK|CMASK) at step 128. The new FMIN value becomes the minimum of the CMIN and FMIN values, and the new FMAX value becomes the maximum of the CMAX and FMAX values at step 128. The BMIN and BMAX values remain intact 128. FIG. 15G illustrates the change of the RMASK after considering the influence of the new pixels of the current triangle and FIG. 15H is a sketched top view of FIG. 15G. The subroutine E then returns to process 500 of FIG. 5.

Figure 16C:
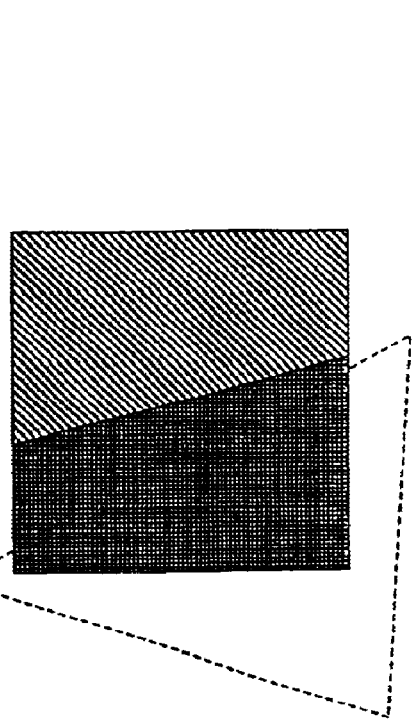
FIGS. 16A–16H are exemplary illustrations of pixels of a triangle whose z-ranges intersect with the z-ranges of the back layer but not the z-ranges of the front layer, and whose pixels are all covered by the front layer.
Figure 16D:
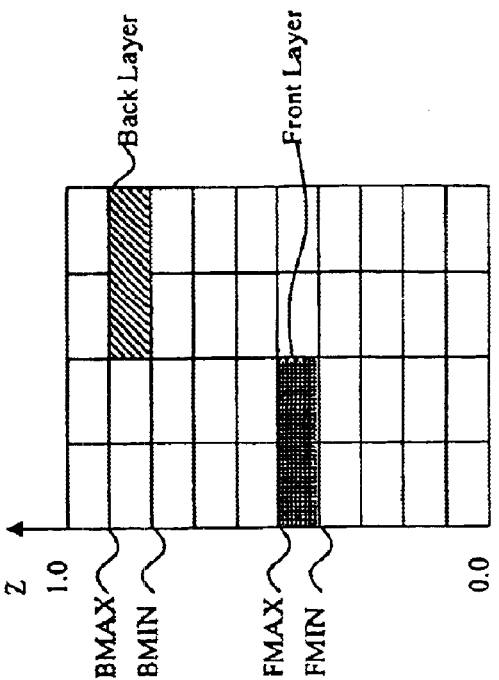
Figure 16A:
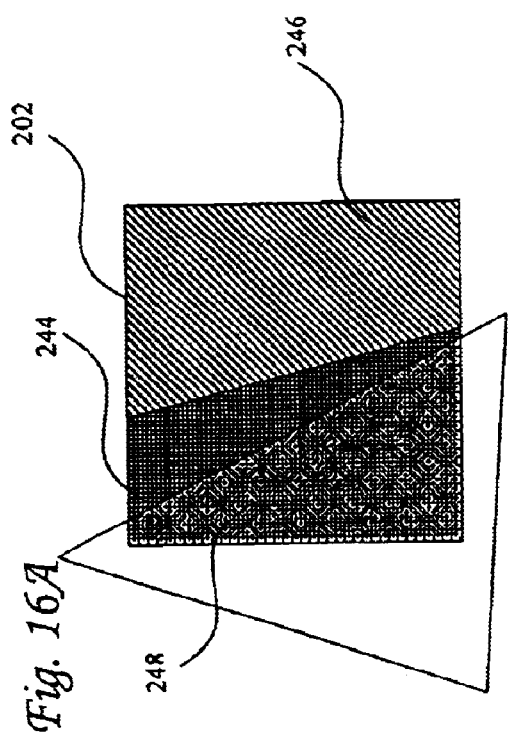
Figure 16B:
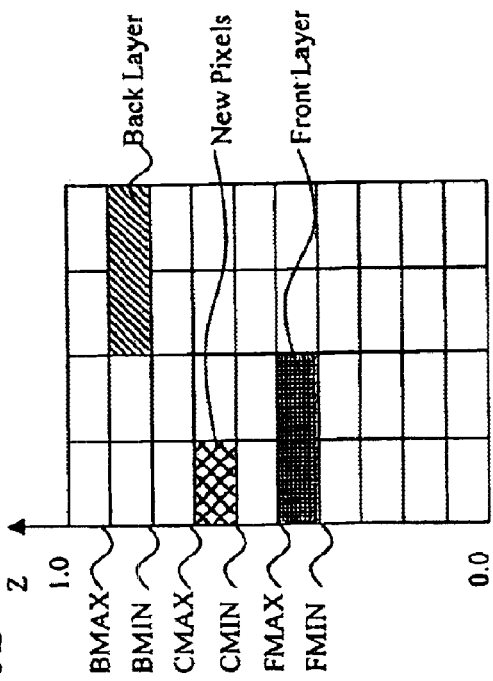
Figure 16G:
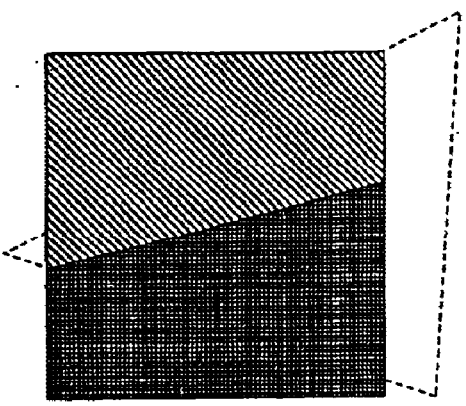
Figure 16H:
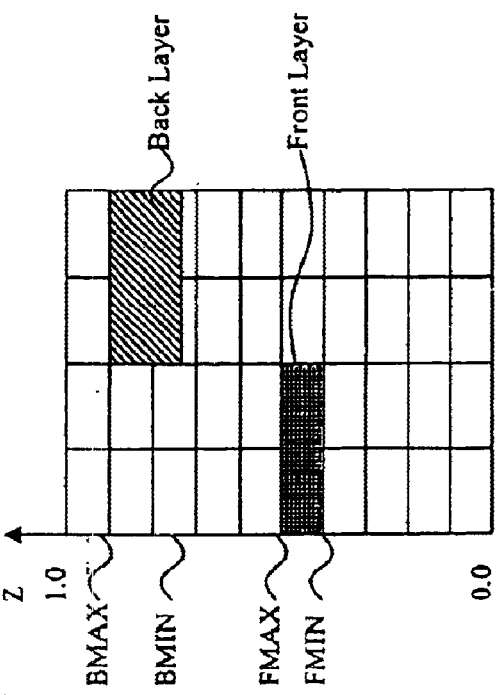
Figure 16E:
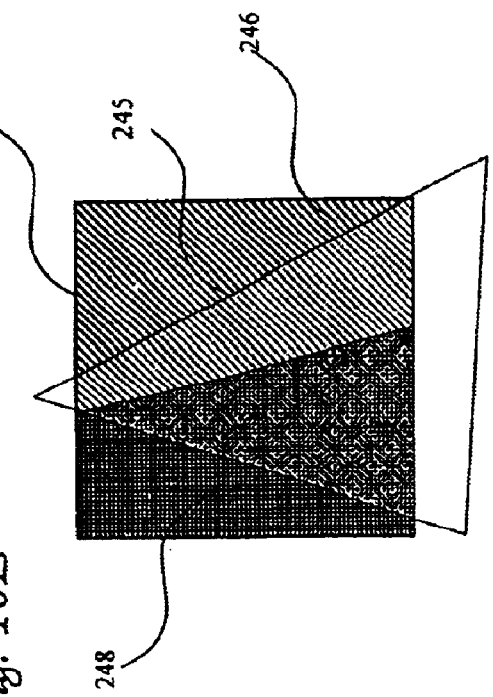
Figure 16F:
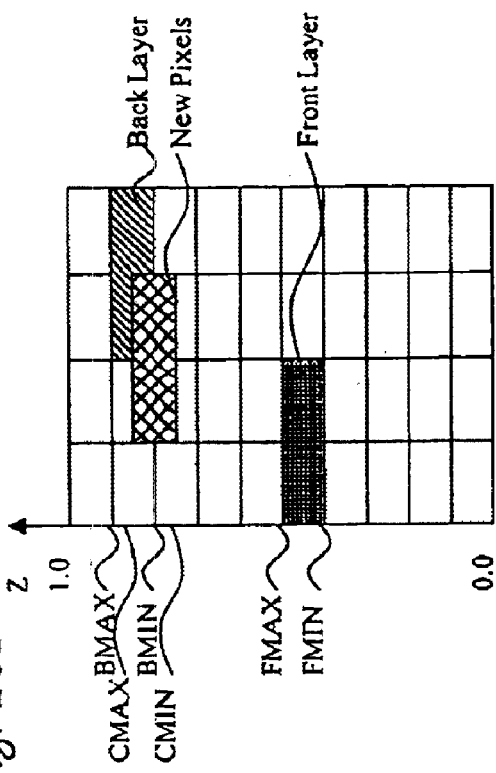

Going back to step 635 of FIG. 6A, the NO branch of this inquiry causes the subroutine to further inquire at step 645 whether the new image intersects the back layer, but not the front layer (i.e., CMIN>=FMAX & CMIN<BMAX & CMAX>BMIN). A YES response indicates that the z-ranges of the new pixels intersect with the z-ranges of the back layer but not the z-ranges of the front layer and the process advances to subroutine F 650. Please refer to FIG. 6F. The subroutine F then proceeds at step 132 to inquire whether the front layer covers all the new pixels making up the current triangle. A YES response sets the READ_Z_BUFFER variable to FALSE at step 134 because the new pixels are obscured by the front layer. As illustrated in FIGS. 16A and 16B, the z-values of the new pixels making up the current triangle 244 intersect with a back layer 246. However, those pixels are hidden from view by a front layer 248. Accordingly, no further action is required. FIG. 16C illustrates the change of the RMASK after considering the influence of the new pixels of the current triangle and FIG. 16D is a sketched top view of FIG. 16C. No updates to the range buffer are necessary, and the subroutine F simply returns to process 500 of FIG. 5.

A NO response at step 132 causes the subroutine F to inquire at step 136 whether the front layer does not cover all the new pixels. In this case, the READ_Z_BUFFER Boolean is set to TRUE at step 138 because pixel-by-pixel comparisons of the z-values of the new pixels with the z-values in the z-buffer are required to be performed. The subroutine F then proceeds to step 138 to set the value of the RZMASK to determine which pixels require performing pixel-by-pixel z-buffer-comparison. In the present situation, the current triangle intersects the back layer, and therefore, the intersected pixels can be determined and set by bit-wise logic AND operation on CMASK and ~RMASK ("~RMASK" indicates the bit-wise inverse of RMASK), and thus RZMASK=CMASK & ~RMASK. An example is shown in FIGS. 19A–9C. The subroutine F then advances to decision diamond 140 to check which phase it is now. If it is in the first pass phase, we have to determine the ZTEST values for all the sub-blocks in the display blocks 202 in step 142 so that the ZTEST values can be used in the second pass phase. The ZTEST value of a specific sub-block can be acquired by performing bit-wise logic OR operation of all RZMASK bits corresponding to that sub-block. For the example shown in FIGS. 19A–19C, the display block includes four sub-blocks, SUB-BLOCK 0, SUB-BLOCK 1, SUB-BLOCK 2, and SUB-BLOCK 3, and the ZTEST is[1111]. Alternatively, in the example shown in FIGS. 20A–20C, the display block and current triangle are the same as those in FIGS. 19A–19C but the four sub-blocks are arranged differently as SUB-BLOCK 0', SUB-BLOCK 1', SUB-BLOCK 2', and SUB-BLOCK 3', and the ZTEST is [0111]. The result can be interpreted as: if the sub-block contains a pixel which requires performing z-buffer subroutine, the corresponding ZTEST field is set to "1"; otherwise, the corresponding ZTEST field is set to "0" and no z-buffer subroutine is required. Otherwise, an answer of NO at step 140 indicates that the first pass has been completed and the ZTEST field has been set. The process next updates the range buffer at step 144 by setting the new BMIN value to the smaller of the old BMIN and CMIN values, and setting the new BMAX value to the bigger of the old BMAX and CMAX values, as illustrated in FIGS. 16E–16H. The RMASK, FMIN, and FMAX values remain the same 144. The subroutine F then returns to main process 500 of FIG. 5.

Figure 6G:
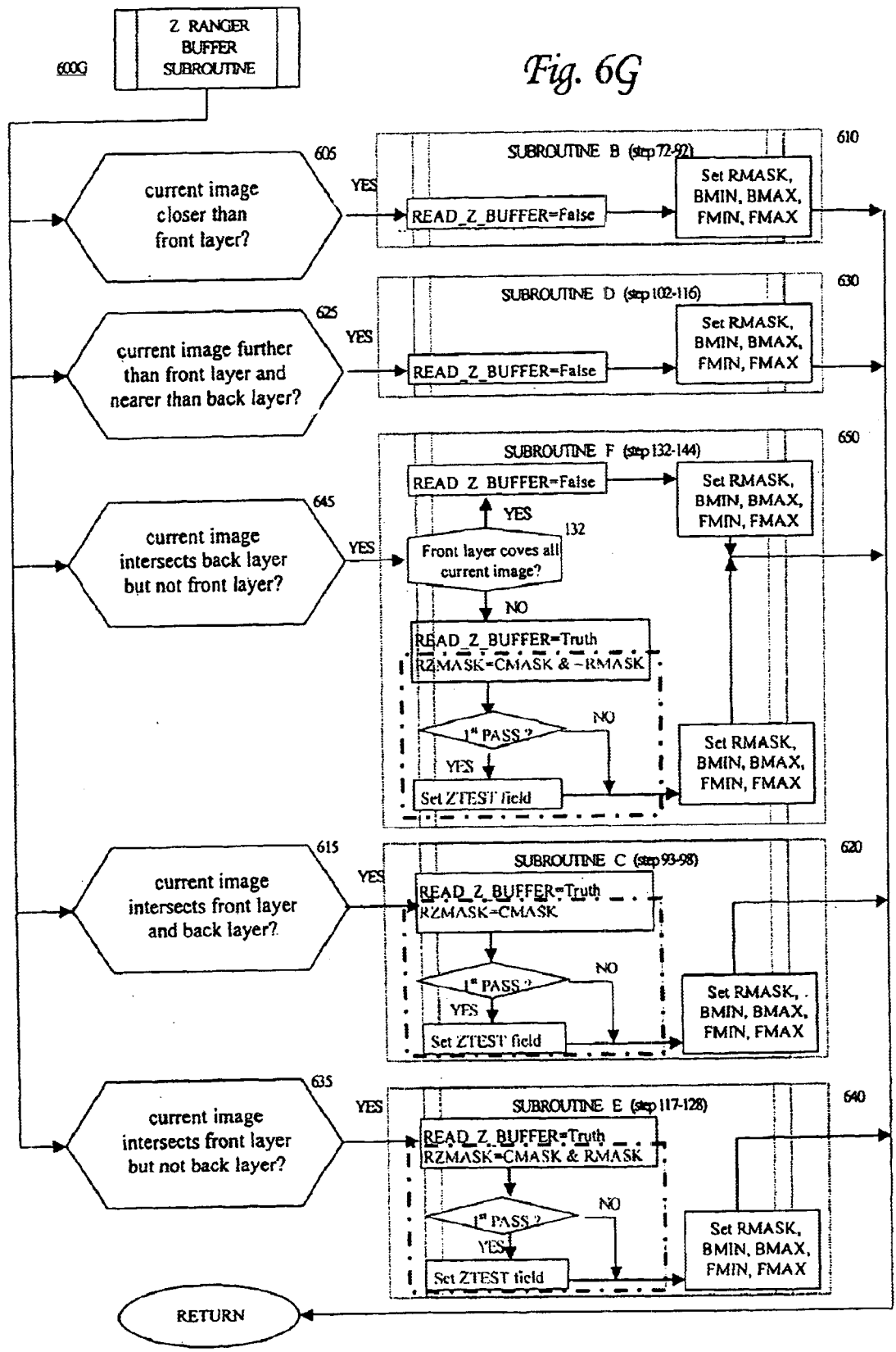

Described with reference to FIGS. 6A–6F have been subroutines where a current image was introduced. In proceeding through descriptions of FIGS. 6A–6F, the current image was first described as being closest to a view (i.e., description of FIG. 6A) until the new image was furthest from a view plane (i.e., description of FIG. 6D). This methodology provided for an understandable progression. With a full understanding of the subroutines of FIGS. 6A–6F, a summary process 600G shown in FIG. 6G can now be understood. Shown in FIG. 6G are situations where the READ_Z_BUFFER Boolean is set to TRUE and, separately, situations where the READ_Z_BUFFER Boolean is set to FALSE. As shown, there are three situations when the READ_Z_BUFFER Boolean is set to FALSE and the z-buffer will not have to be read. These are situations wherein the present invention provides the most performance improvement. The READ_Z_BUFFER Boolean will be set to FALSE when the current new image is closer than the front layer (step 605), the new image is between the front and back layer with no intersection (step 625), and the new image does not intersect the front layer, intersects the back layer (step 645), and is fully covered by the front layer (YES branch of step 132). As indicated in FIG. 6G, these steps correspond to the previously described subroutines B, D, and F, respectively. After the READ_Z_BUFFER Boolean is set to FALSE, the steps to set RMASK, BMIN, BMAX, FMIN, and FMAX depending on respective conditions are followed. Conversely, there are three situations when the READ_Z_BUFFER Boolean are set to TRUE and the z-buffer will have to be read. These are situations wherein the present invention provides the further performance improvement. When the new image intersects the front layer and does not intersect the back layer (step 635); when the new image does not intersect the front layer, intersects the back layer (step 645), and is not fully covered by the front layer (the NO branch of the step 132); and, when the new image intersects the front and back layers (step 615). These steps correspond to the previously described subroutines E, F, and C, respectively. For these conditions that the READ_Z_BUFFER Boolean are set to TRUE, i.e., the z-buffer read should be performed therefor, a read-z-buffer bitmask RZMASK is determined and the ZTEST field corresponding to the sub-blocks is further determined in the first pass, as shown in the blocks formed in the bold center line. This mechanism provides in the original data structure size an approach to tell the sub-blocks which require performing z-buffer read from those which do not require performing z-buffer read in the first pass but do not perform the z-buffer read in the first pass while performing the z-buffer read for those new pixel in the identified sub-blocks only rather than the whole display block. Although the bus traffic cost for reading the triangle data twice is increased a little with respective to reading only once, the performance, however, is improved because only limited rather than all triangle data is read for judge the conflict and that the bus traffic due to z-buffer read is also decreased since only some of the sub-blocks rather than the whole display block are involved. Through an understanding of subroutine 600G of FIG. 6G, algorithmic optimizations can be achieved in implementing the present invention. Furthermore, in FIG. 6G, the decision diamonds 605, 615, 625, 635, and 645 in flow chart 600G are parallel rather than sequential as the flow chart 600 in FIG. 6A. In fact, the conditions in the decision diamonds 605, 615, 625, 635, and 645 in flow 600G of FIG. 6G are exclusive to each other and thus only one condition will occur at most; therefore, no specific sequence is necessary. The sequence shown in flow 600 of FIG. 6A is simply one of the possible alternatives thereof.

Although this invention has been described in certain specific embodiments, those skilled in the art will have no difficulty devising variations which in no way depart from the scope and spirit of the present invention. For instance, instead of only using two layers corresponding to a front and back layer, one skilled in the art might appreciate using one, three, or more layers of a block for comparing z-range values. A person skilled in the art will also appreciate that the z-range buffer will have to be modified to store the minimum and maximum z-values of all the layers used.

It is therefore to be understood that this invention may be practiced otherwise than is specifically described. Thus, the present embodiments of the invention should be considered in all respects as illustrative and not restrictive, the scope of the invention to be indicated by the appended claims and their equivalents rather than the foregoing description.

What is claimed is:

1. A method of rendering a graphics primitive to a frame buffer for a display, the frame buffer being partitioned into a plurality of equal size blocks of pixels, each block having at least two depth-layers, the frame buffer having an associated z-buffer with an depth value for each pixel in the frame buffer, the depth value determining the visibility of a pixel on the display, the method comprising:

determining the blocks in the frame buffer that are affected by the graphics primitive;

for each affected block,
adjusting the depth layers of the block,
determining whether any pixels of the graphics primitive for the block intersect any of the depth-layers of the block, the block being partitioned into a plurality of equal size sub-blocks and having a sub-block mask that includes a bit for each sub-block; and
if any pixels of the graphics primitive for the block intersect any of the depth-layers, setting a flag indicating that the z-buffer requires an update for the block, forming a pixel mask that indicates which pixels in the block are intersecting pixels, and combining the pixel mask with the sub-block mask to determine which sub-blocks have intersecting pixels;

again determining the blocks in the frame buffer that are affected by the graphics primitive; and for each affected block,
adjusting the depth layers of the block,
determining whether or not there is an update flag set for the block,
if there is no update flag set, rendering the visible pixels to the frame buffer based on the adjusted depth layers
if the update flag is set, then for each sub-block of the affected block, determining based on the sub-block mask whether the sub-block is affected by any intersecting pixels; and if the sub-block is affected, reading the z-buffer, adjusting the visibility entry for the intersecting pixels, and rendering any visible pixels to the frame buffer.

2. A method of rendering a graphics primitive to a frame buffer, as recited in claim 1, wherein there is a front depth-layer and a back-depth layer for each affected block, and the front and back layers each have a range of depth values in the block, each range having a min and max value, the min value being the closer value; and wherein the graphics primitive has a range of depth values for the pixels affected in the block by the primitive, the graphics primitive range having a min and max value.

3. A method of rendering a graphics primitive to a frame buffer, as recited in claim 2, wherein a mask is associated with the block, the mask describing which pixels in the block belong to the front layer and to the back layer.

4. A method of rendering a graphics primitive to a frame buffer, as recited in claim 2, wherein a mask is associated with the graphics primitive, the mask describing which pixels in the block are affected by the graphics primitive.

5. A method of rendering a graphics primitive to a frame buffer, as recited in claim 2,
- wherein pixels affected in the block by the graphics primitive intersect both the front layer and the back layer;
- wherein the pixel mask indicates that all the pixels affected in the block are intersecting pixels;
- wherein the front and back layer are both adjusted to have a range of depth values between
  - (i) the minimum of the graphics primitive min and front layer min and
  - (ii) the maximum of the graphics primitive max and back layer max, and
  - to include front layer, back layer and pixels affected in the block by the graphics primitive.

6. A method of rendering a graphics primitive to a frame buffer, as recited in claim 2,
- wherein pixels affected in the block by the graphics primitive intersect the front layer but not the back layer;
- wherein the pixel mask indicates which of the front layer pixels are intersected;
- wherein if the pixels affected in the block cover all of the back layer in the block, the front and back layers are both adjusted to have a range of depth values between
  - (i) the minimum of the graphics primitive min and the front layer min,
  - (ii) the maximum of the graphics primitive max and front layer max, and
  - to include the front layer pixels and the pixels affected in the block by the graphics primitive;
- wherein if the pixels affected in the block do not cover all of the back layer, the front layer is adjusted to have a range of depth values between
  - (i) the minimum of the graphics primitive min and the front layer min,
  - (ii) the maximum of the graphics primitive max and the front layer max, and
  - to include in the front layer the pixels affected by the graphics primitive and the front layer pixels; and
- the back layer range is unchanged and includes only pixels not covered by the pixels affected by the graphics primitive.

7. A method of rendering a graphics primitive to a frame buffer, as recited in claim 2,
- wherein pixels affected in the block by the graphics primitive intersect the back layer but not the front layer and the front layer does not cover all of the pixels affected by the graphics primitive;
- wherein the pixel mask indicates which pixels of the back layer are intersected;
- wherein the back layer is adjusted to have a range between
  - (i) the minimum of the graphics primitive min and the back layer min,
  - (ii) the maximum of the graphics primitive max and the back layer max, and
  - to include in the back layer all of the pixels in the back layer affected by the graphics primitive; and
- wherein the front layer range is unchanged.

8. A graphics rendering apparatus comprising;
- a frame buffer for storing pixels to be displayed, the frame buffer being partitioned into a plurality of equal size blocks of pixels, each block being partitioned into a plurality of equal size sub-blocks;
- a z-buffer associated with the frame buffer, the z-buffer storing a depth value for each pixel in the frame buffer, the depth value determining the visibility of a pixel on the display; and
- a graphics processor for processing the pixels of the z-buffer and frame buffer, the graphics processor including
- z-range buffer having fields for indicating for a block a depth range for a front layer, a depth range for a back layer, a mask indicting which pixels in the block are in the front layer and back layer; and a field for storing sub-block information that indicates whether or not the z-buffer must be read for the sub-block;
- a first register having fields for indicating which pixels in a block are affected by a graphics primitive and for indicating the depth range of the pixels in the block affected by the graphics primitive;
- a second register having a field for indicating which pixels in the block require the z-buffer to be read, and
- a flag indicating that the z-buffer must be read for a block.

9. A graphics rendering apparatus as recited in claim 8, wherein the graphics processor is configured to:
- determine which pixels in a block are affected by a graphics primitive and the depth range of the pixels in a block affected by the graphics primitive and to set the fields in the first register accordingly;
- determine whether the pixels in a block affected by a graphics primitive intersect the front layer, the back layer or both layers;
- set the flag if the z-buffer must be read for a block;
- adjust the ranges of the front and back layers in the z-range buffer based on the pixels in a block affected by the graphics primitive and the depth range of the affected pixels;
- if the flag is not set, render visible pixels to the frame buffer depending on the adjusted front and back layers;
- if the flag is set, determine which pixels in the block require the z-buffer to be read and setting the field in the second register accordingly based on the intersection determination, determine which sub-blocks in the block require the z-buffer to be read and set the field in the z-range buffer accordingly, read the z-buffer to obtain the depth values for the sub-block, and render the visible pixels to the frame buffer depending on the depth values obtained for the sub-block.

* * * * *